(12) United States Patent
Kang et al.

(10) Patent No.: US 11,539,423 B2
(45) Date of Patent: Dec. 27, 2022

(54) METHOD FOR PERFORMING BEAM FAILURE RECOVERY PROCEDURE IN WIRELESS COMMUNICATION SYSTEM, AND DEVICE THEREFOR

(71) Applicant: LG ELECTRONICS INC., Seoul (KR)

(72) Inventors: Jiwon Kang, Seoul (KR); Hyungtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/672,464

(22) Filed: Feb. 15, 2022

(65) Prior Publication Data

US 2022/0173788 A1 Jun. 2, 2022

Related U.S. Application Data

(63) Continuation of application No. PCT/KR2020/010964, filed on Aug. 18, 2020.
(Continued)

(30) Foreign Application Priority Data

Aug. 16, 2019 (KR) .................... 10-2019-0100657

(51) Int. Cl.
*H04B 7/06* (2006.01)
*H04L 5/00* (2006.01)
*H04W 76/19* (2018.01)
*H04L 1/18* (2006.01)
*H04B 7/024* (2017.01)
*H04B 7/0408* (2017.01)
*H04W 68/02* (2009.01)
(Continued)

(52) U.S. Cl.
CPC ......... *H04B 7/0695* (2013.01); *H04L 5/0051* (2013.01); *H04W 76/19* (2018.02)

(58) Field of Classification Search
CPC ..... H04B 7/0695; H04L 5/0051; H04W 76/19
See application file for complete search history.

(56) References Cited

U.S. PATENT DOCUMENTS

2019/0379506 A1\* 12/2019 Cheng ................... H04L 1/0026
2020/0260300 A1\* 8/2020 Cirik ..................... H04W 24/08
(Continued)

FOREIGN PATENT DOCUMENTS

KR 10-2019-0017675 A 2/2019
WO 2018/190617 A1 10/2018

OTHER PUBLICATIONS

"5G; NR; Requirements for Support of Radio Resource Management (3GPP TS 38.133 version 15.6.0 Release 15)", ETSI TS 138 133 V15.6.0, Jul. 25, 2019, See pp. 82 and 89.
(Continued)

*Primary Examiner* — Harry H Kim
(74) *Attorney, Agent, or Firm* — Dentons US LLP

(57) ABSTRACT

A method of performing, by a user equipment (UE), a beam failure recovery (BFR) procedure in a wireless communication system comprises performing a detection of a beam failure, transmitting a beam failure recovery request (BFRQ), and receiving a response to the BFRQ. The detection of the beam failure is related to at least one specific RS, and the at least one specific RS is related to a specific control resource set (CORESET) group of a plurality of CORESET groups.

11 Claims, 15 Drawing Sheets

Base station Rx beam sweeping

UE TX beam (being fixed)

(a)

Base station beam being fixed

UE Tx beam sweeping (b)

Related U.S. Application Data

(60) Provisional application No. 62/887,590, filed on Aug. 15, 2019.

(51) Int. Cl.
*H04W 72/04* (2009.01)
*H04W 74/08* (2009.01)

(56) References Cited

U.S. PATENT DOCUMENTS

2021/0314051 A1* 10/2021 Yang ............... H04W 74/0841
2022/0053360 A1* 2/2022 Sun ..................... H04W 24/10

OTHER PUBLICATIONS

LG Electronics, "Enhancements on Multi-TRP/Panel Transmission", R1-1906730, 3GPP TSG RAN WG1 Meeting #97, May 4, 2019, See p. 4.

Huawei, "Beam Failure Recovery For SCell With New Beam Information", R1-1907533, 3GPP TSG RAN WG1 Meeting #97, May 3, 2019, See Sections 2.1-2.2; and Figure 1.

* cited by examiner

[FIG. 1]
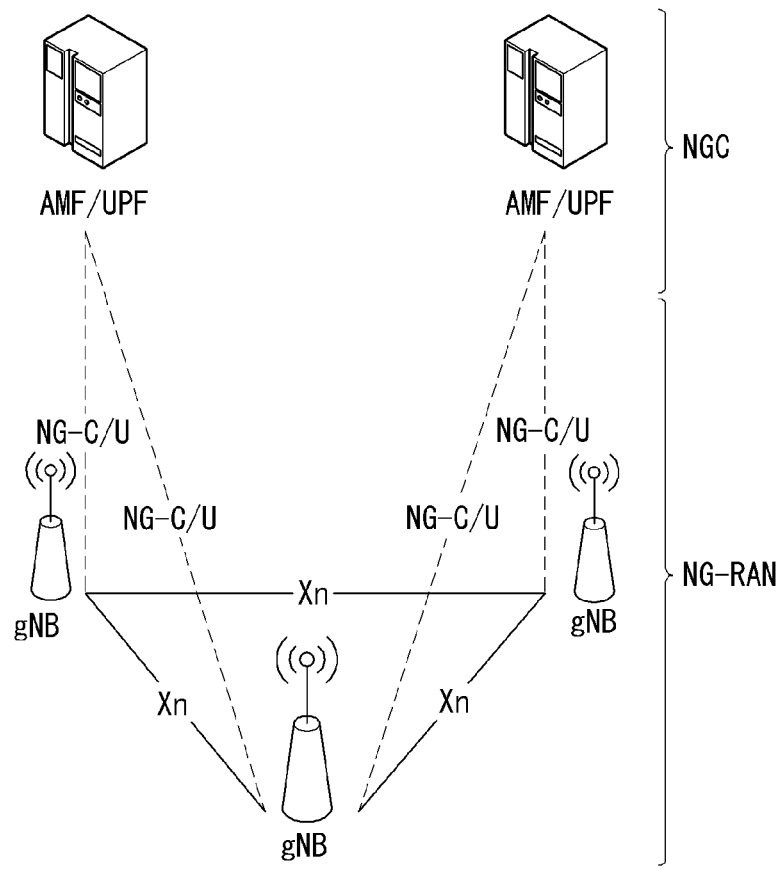
[FIG. 2]
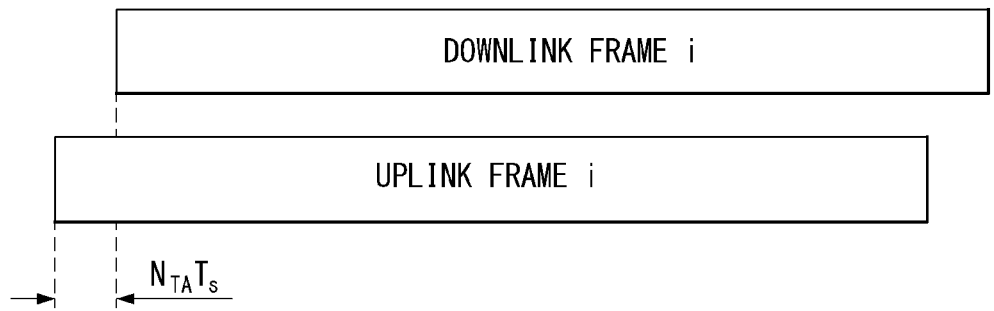

[FIG. 3]
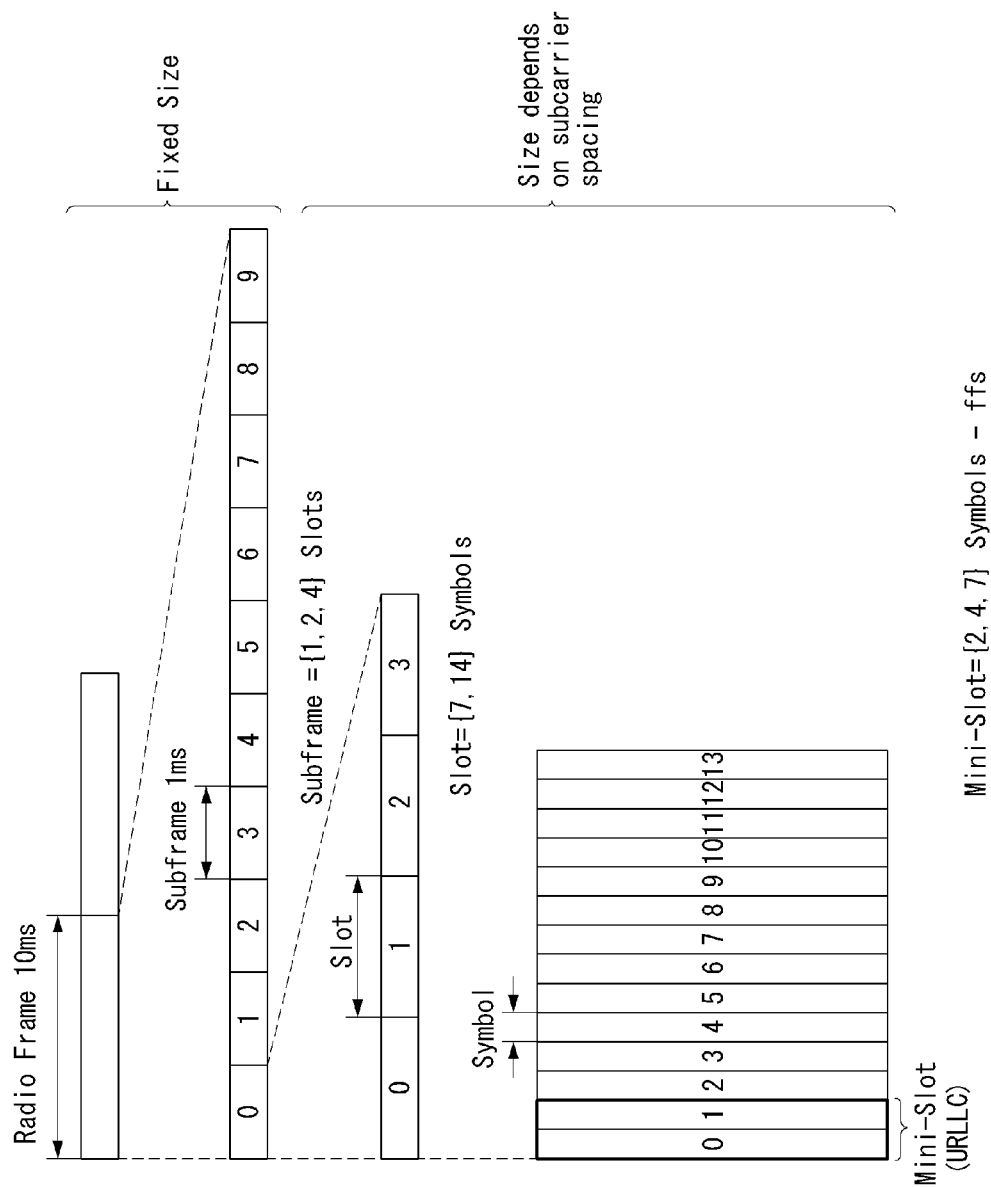

[FIG. 4]
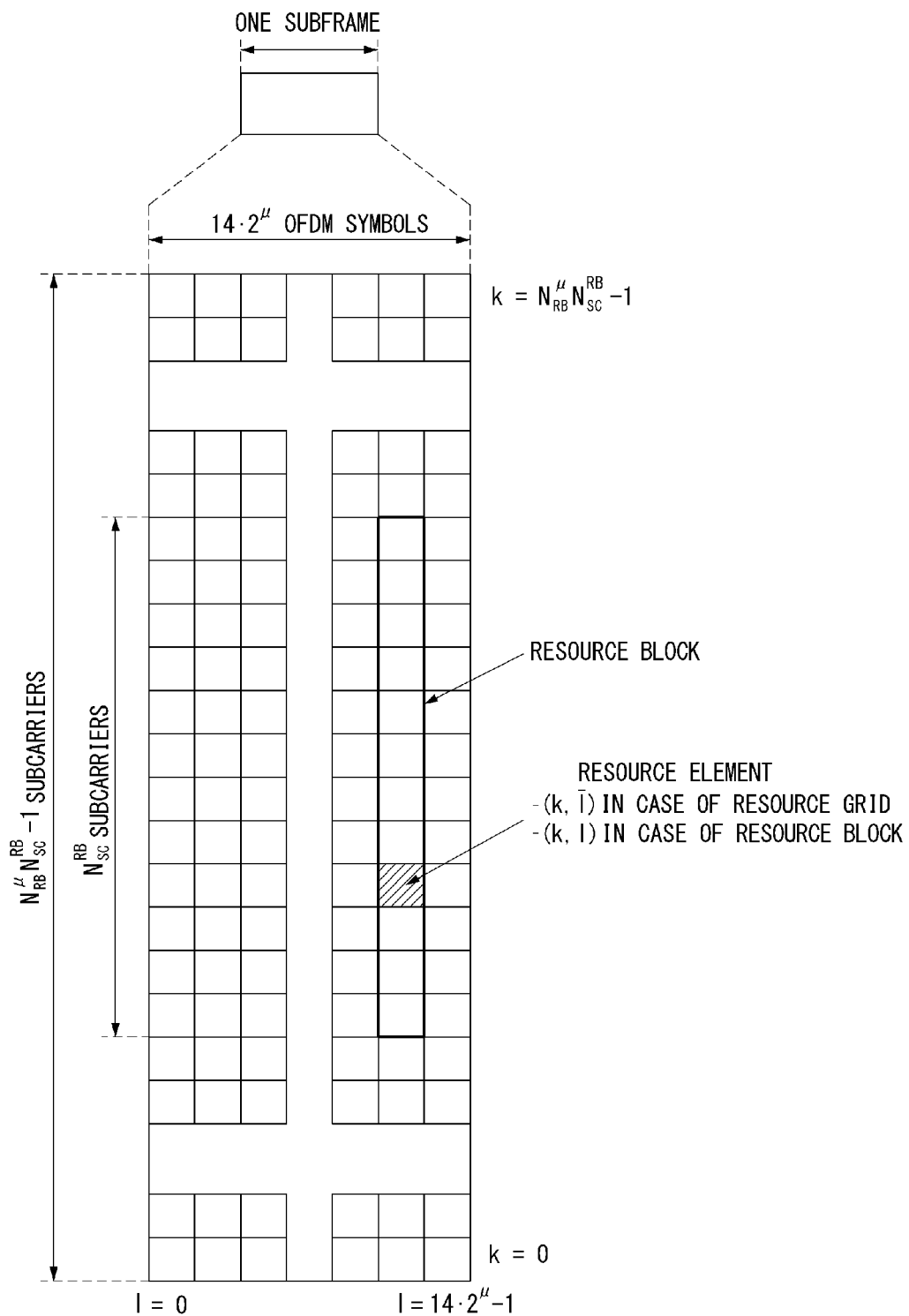

[FIG. 5]
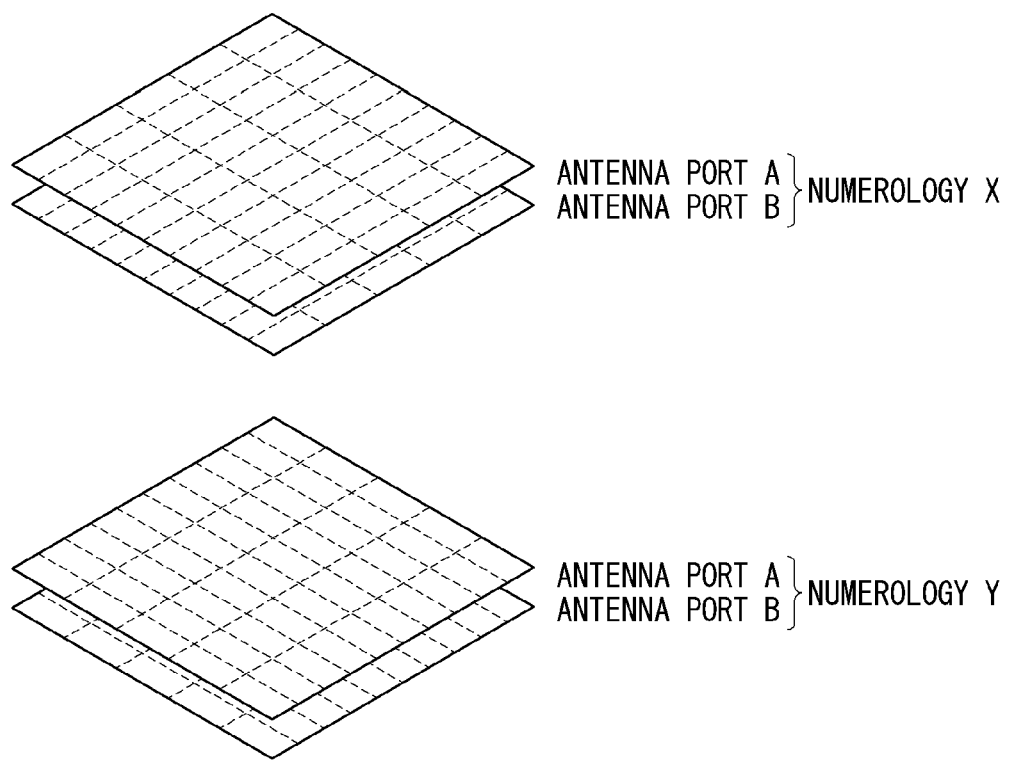

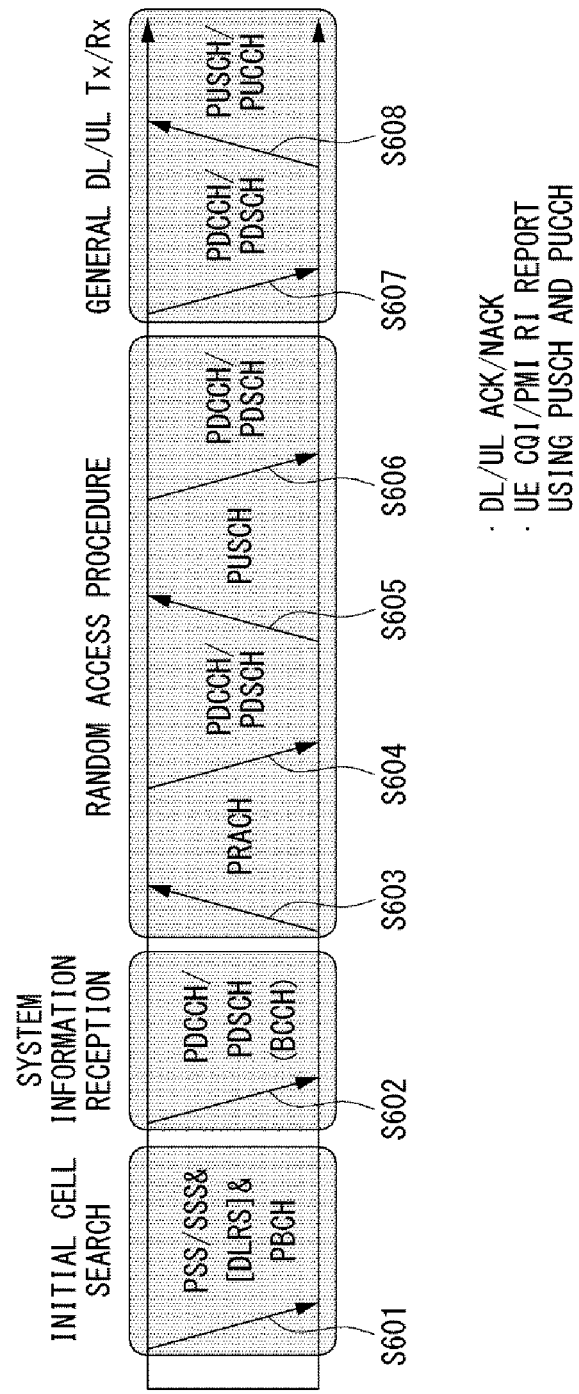
[ FIG. 6 ]

[FIG. 7]
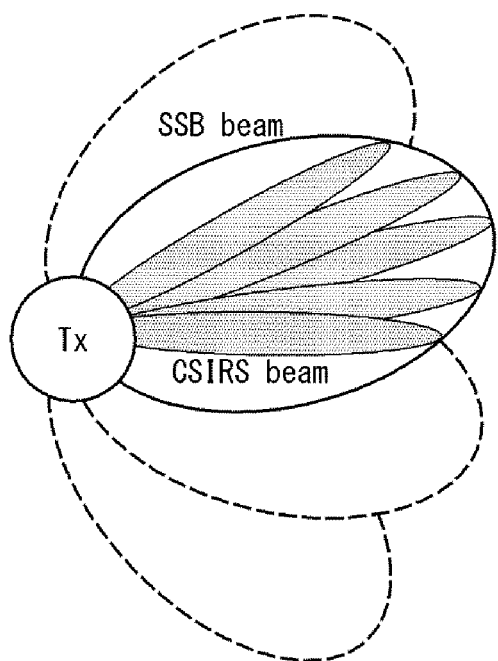
[FIG. 8]
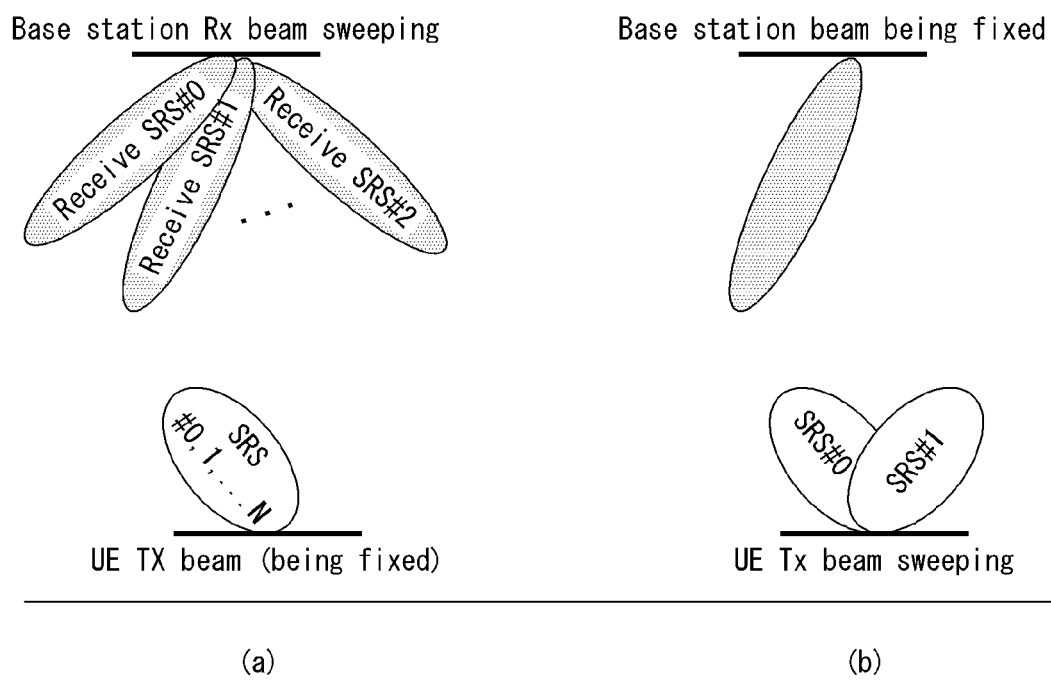

[FIG. 9]
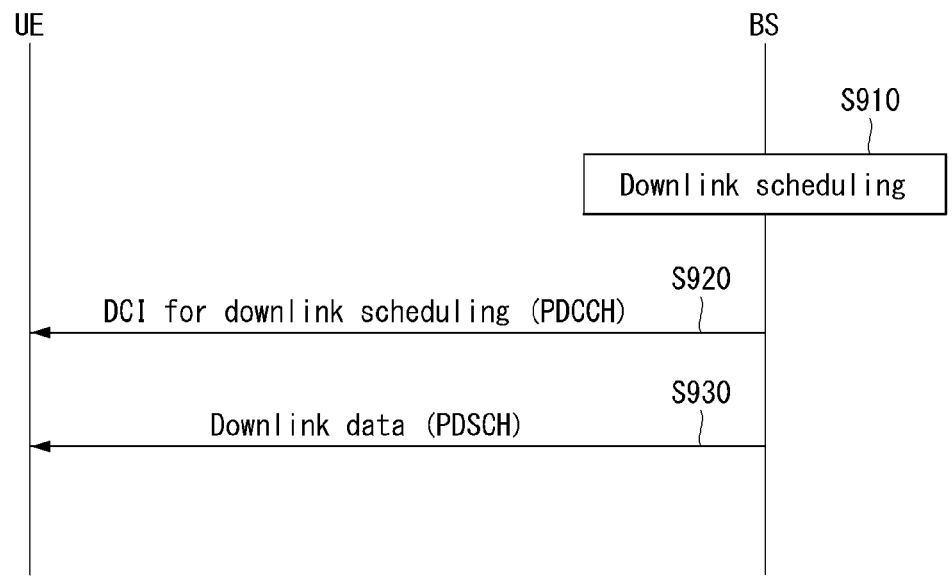
[FIG. 10]
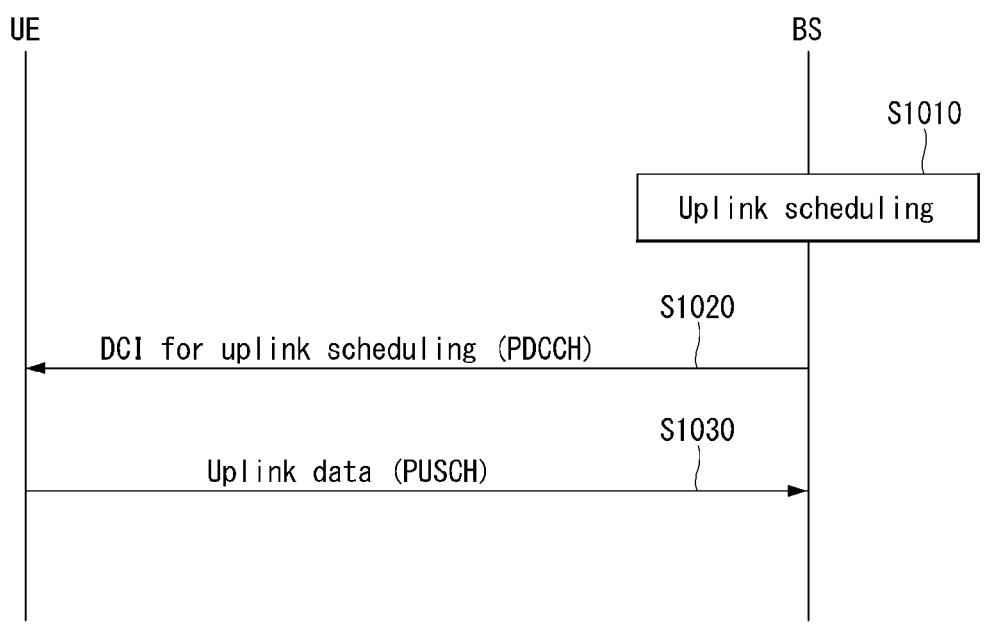

[FIG. 11]
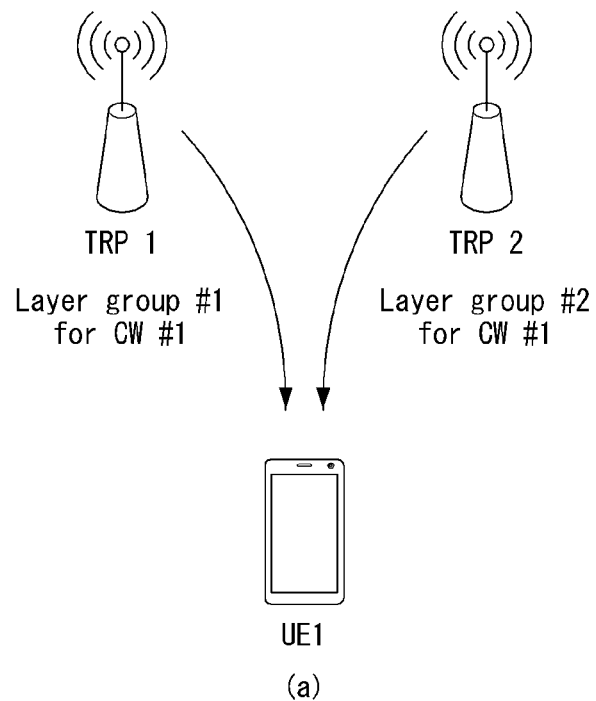
(a)
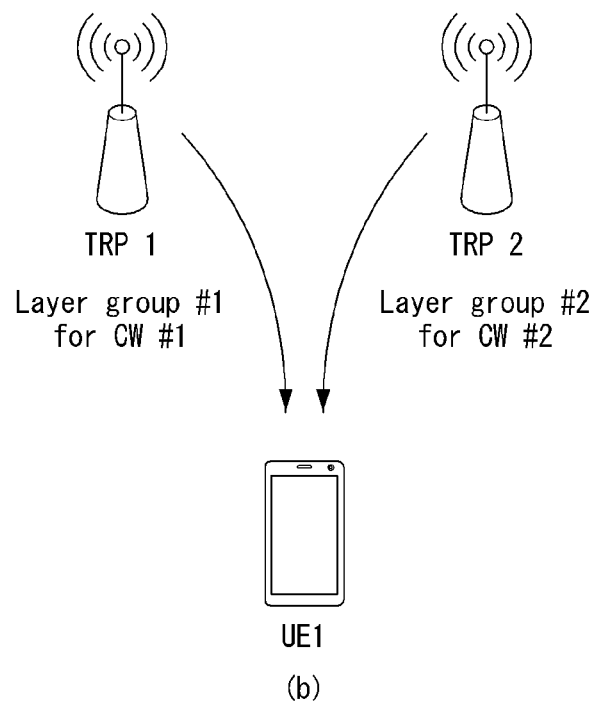
(b)

[ FIG. 12 ]
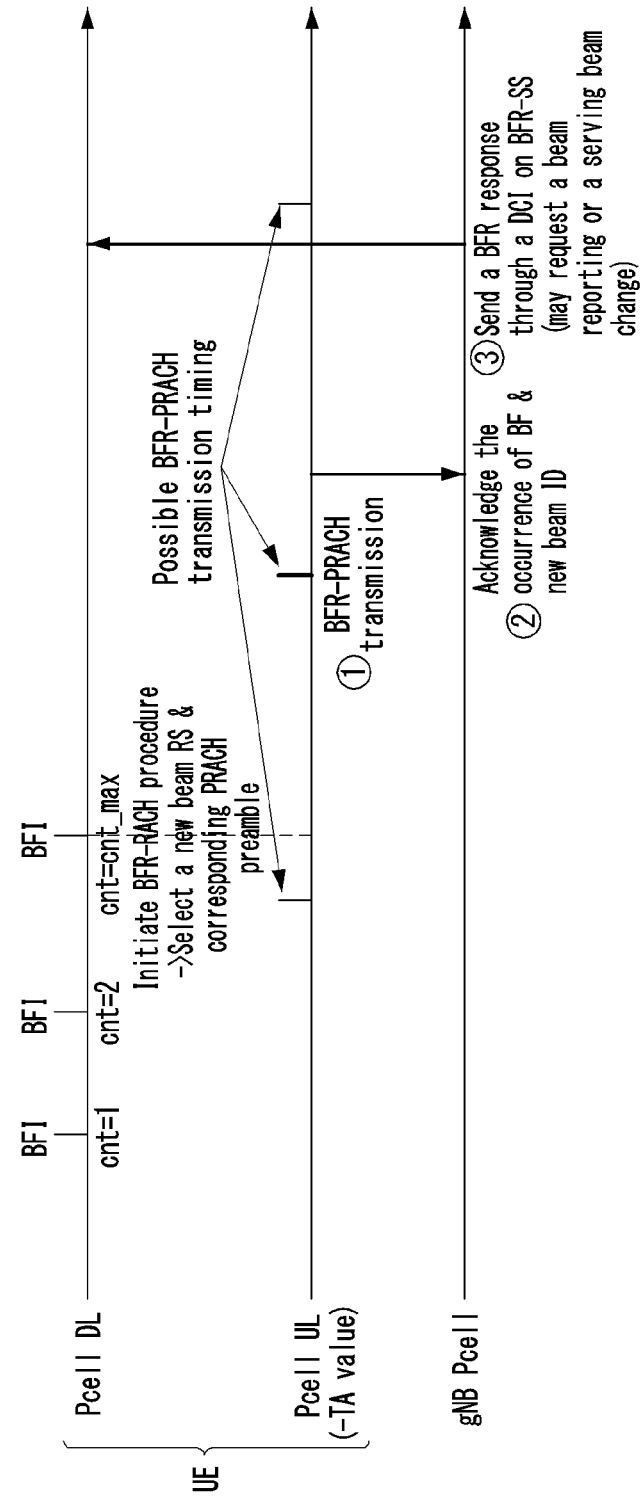

[FIG. 13]
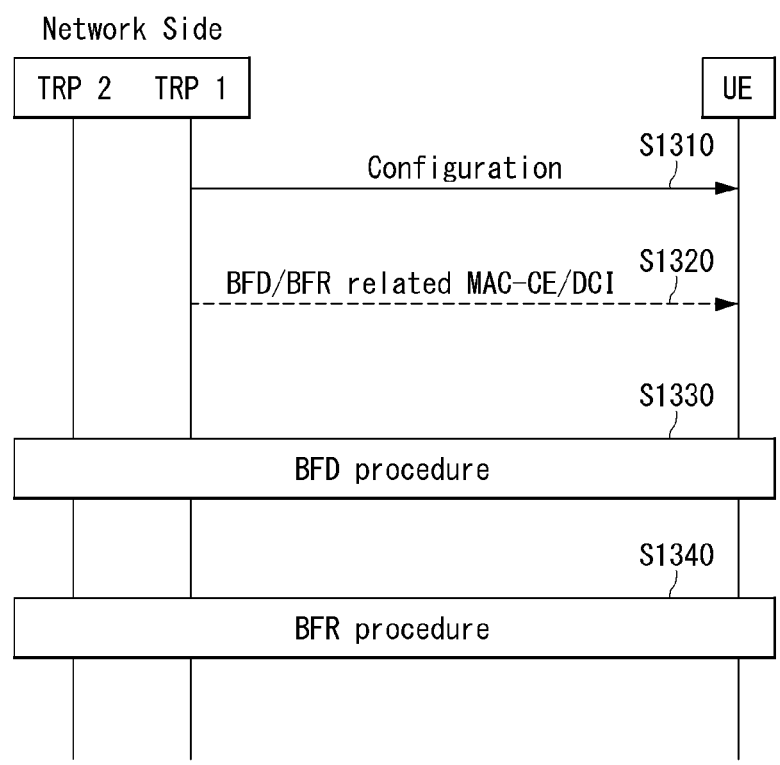

[FIG. 14]
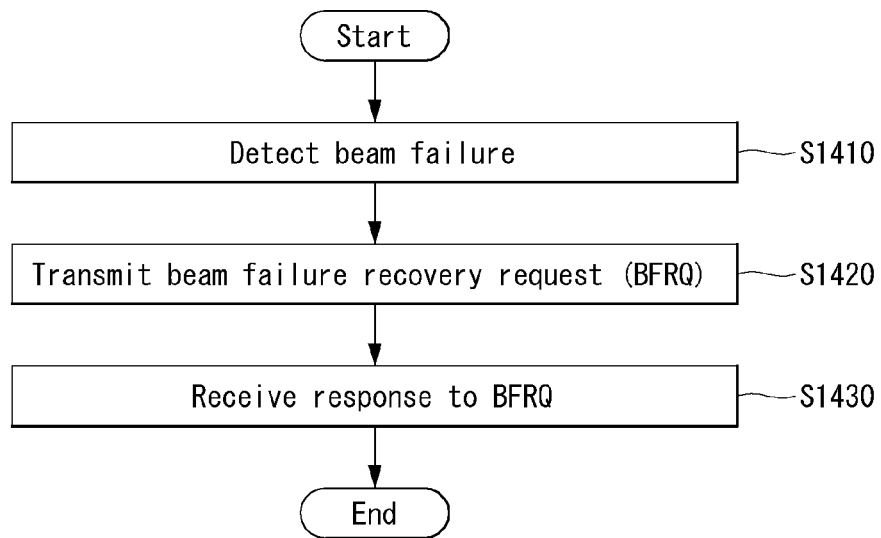
[FIG. 15]
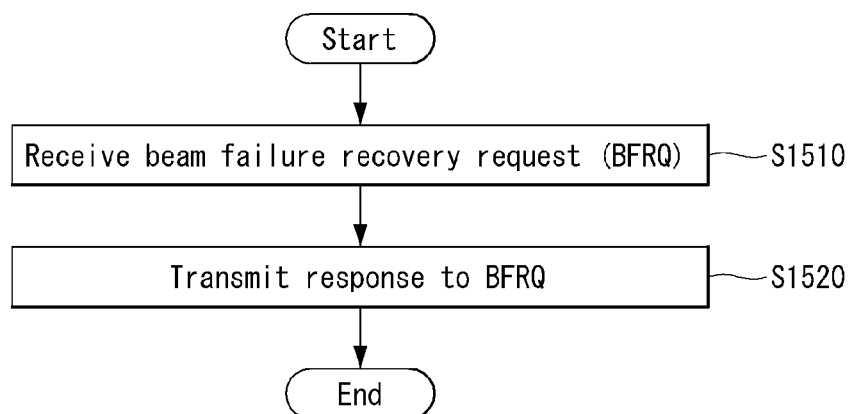

[FIG. 16]
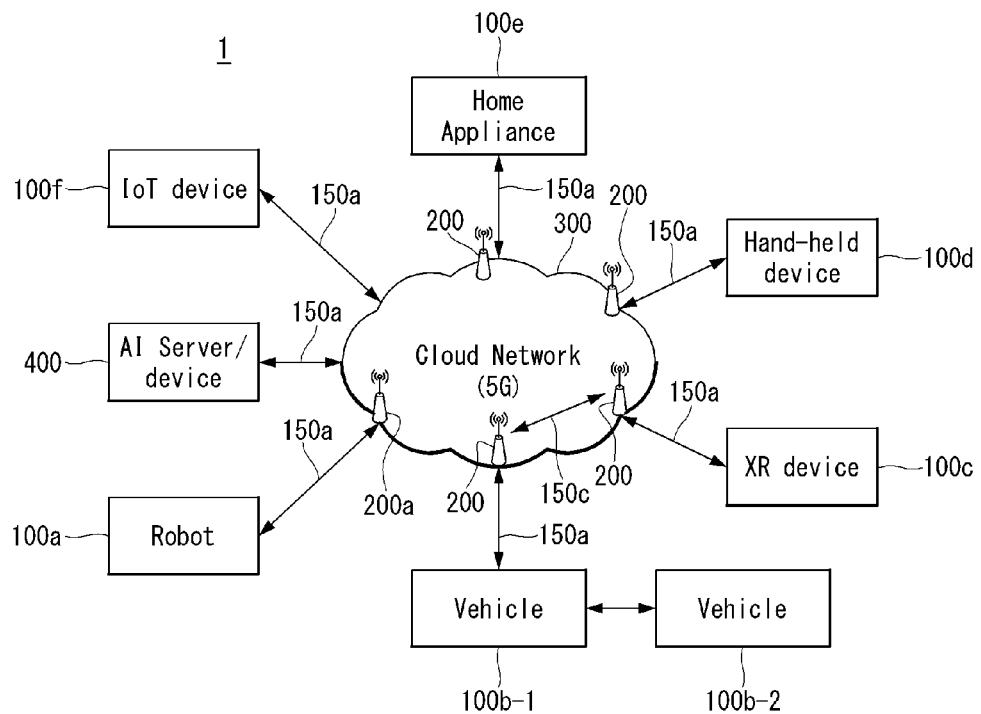
[FIG. 17]
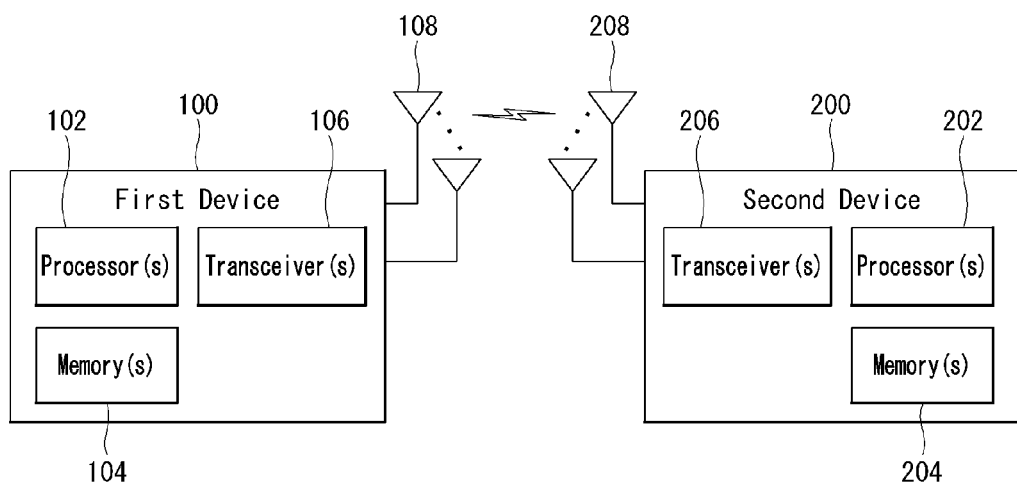

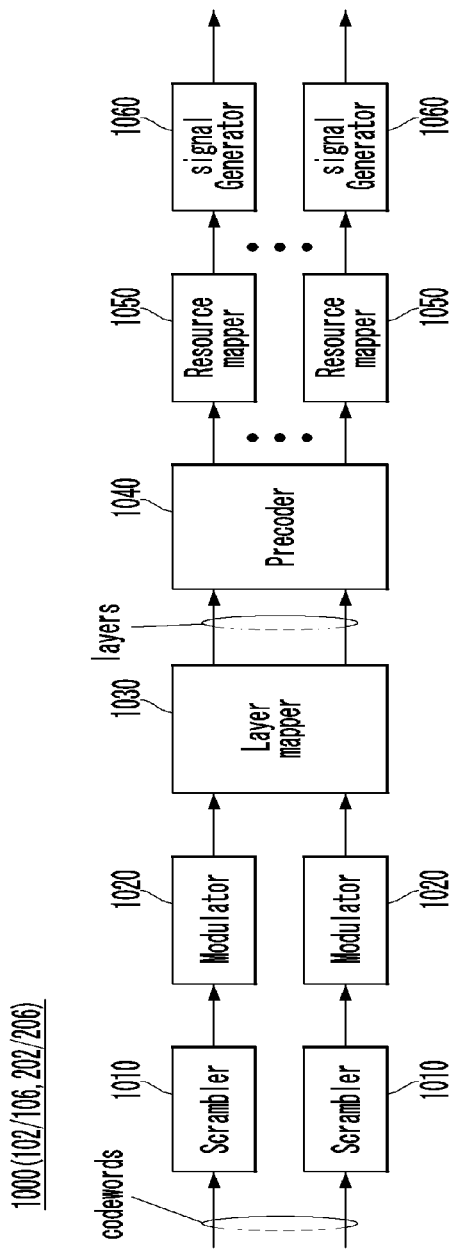
[ FIG. 18 ]

[FIG. 19]
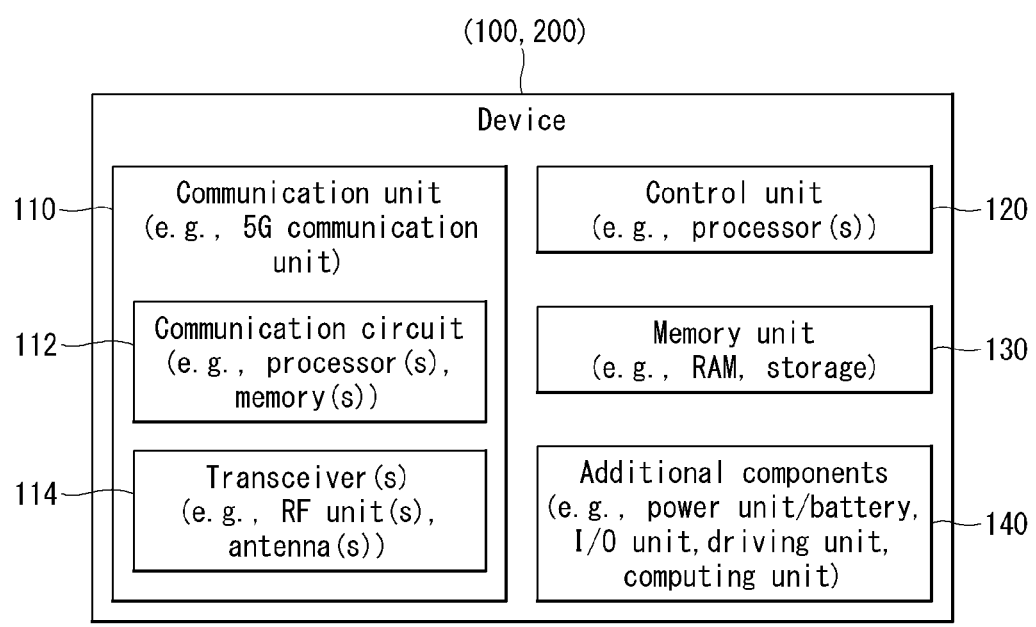

[FIG. 20]
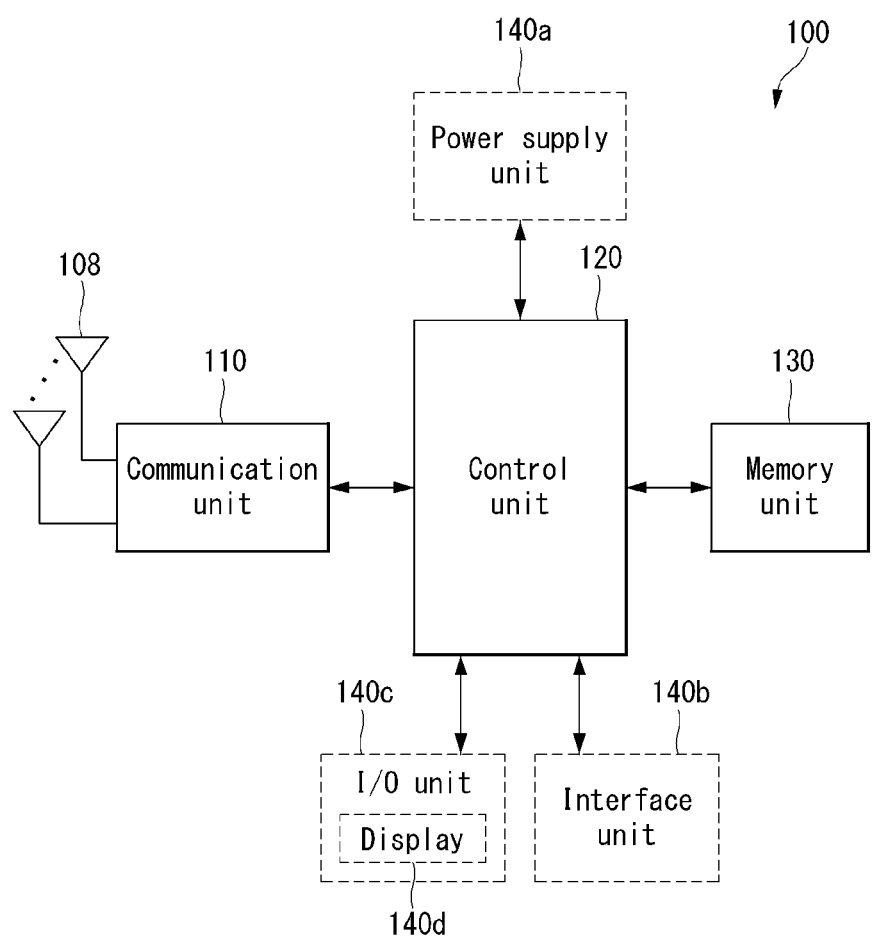

METHOD FOR PERFORMING BEAM FAILURE RECOVERY PROCEDURE IN WIRELESS COMMUNICATION SYSTEM, AND DEVICE THEREFOR

CROSS-REFERENCE TO RELATED APPLICATIONS

This application is the Continuation Bypass of International Application No. PCT/KR2020/010964, filed on Aug. 18, 2020, which claims the benefit of U.S. Provisional Application No. 62/887,590, filed on Aug. 15, 2019, and Korean Application No. 10-2019-0100657, filed on Aug. 16, 2019, the contents of which are all hereby incorporated by reference herein in their entirety.

CROSS-REFERENCE TO RELATED APPLICATIONS

Technical Field

The present disclosure relates to a method of performing a beam failure recovery procedure in a wireless communication system and a device therefor.

Background Art

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure provides a method of performing a beam failure recovery procedure.

Specifically, according to the existing method related to a beam failure of a multi-transmission reception point (TRP), if all of control resource sets (CORESETs) belonging to a specific TRP are in a beam failure situation but there is a CORESET that is not a beam failure among CORESETs belonging to another TRP, the UE does not consider a beam failure to have occurred. If the specific TRP is a TRP (e.g., primary TRP) that is responsible for transmission for important control information, the UE cannot receive the important control information.

The present disclosure provides a method for solving the above-described problems.

Technical objects to be achieved by the present disclosure are not limited to the aforementioned technical objects, and other technical objects not described above may be evidently understood by a person having ordinary knowledge in the art to which the present disclosure pertains from the following detailed description of the present disclosure.

Technical Solution

In one aspect of the present disclosure, there is provided a method of performing, by a user equipment (UE), a beam failure recovery (BFR) procedure in a wireless communication system, the method comprising performing a detection of a beam failure, transmitting a beam failure recovery request (BFRQ), and receiving a response to the BFRQ. The detection of the beam failure is related to at least one specific RS, and the at least one specific RS is related to a specific control resource set (CORESET) group of a plurality of CORESET groups.

The at least one specific RS may include RSs based on transmission configuration indicator (TCI) states related to the specific CORESET group.

The at least one specific RS may be based on RSs pre-configured for the detection of the beam failure.

Based on that a TCI state related to any one CORESET of CORESETs within the specific CORESET group is updated, a specific RS of the pre-configured RSs may be updated.

The specific RS may be based on at least one of i) an RS related to the TCI state, ii) an RS having a quasi co-location (QCL) relationship with the RS related to the TCI state, or iii) an RS based on a specific order among the pre-configured RSs.

The update of the TCI state may be performed based on a specific message, and the specific message may include information for at least one of i) an RS related to the update, ii) the specific RS, or iii) whether the specific RS changes to the RS related to the update.

The plurality of CORESET groups may be related to a plurality of transmission and reception points (TRPs), and the specific CORESET group may be related to a specific TRP of the plurality of TRPs.

The specific TRP may be related to a transmission of specific control information, and the specific control information may be related to at least one of a system information block (SIB), a paging, or a random access (RA).

The method may further comprise receiving a physical downlink shared channel (PDSCH) scheduled by downlink control information (DCI) related to the response to the BFRQ, and transmitting HARQ-ACK information related to the PDSCH.

The HARQ-ACK information may be transmitted based on a specific codebook, and the specific codebook may be related to any one CORESET within the specific CORESET group.

The at least one specific RS may be related to QCL type D.

In another aspect of the present disclosure, there is provided a user equipment (UE) performing a beam failure recovery (BFR) procedure in a wireless communication system, the UE comprising one or more transceivers, one or more processors configured to control the one or more transceivers, and one or more memories operatively connected to the one or more processors and configured to store instructions performing operations when the BFR procedure is executed by the one or more processors.

The operations comprise performing a detection of a beam failure, transmitting a beam failure recovery request (BFRQ), and receiving a response to the BFRQ. The detection of the beam failure is related to at least one specific RS, and the at least one specific RS is related to a specific control resource set (CORESET) group of a plurality of CORESET groups.

The at least one specific RS may include RSs based on transmission configuration indicator (TCI) states related to the specific CORESET group.

In another aspect of the present disclosure, there is provided a device comprising one or more memories, and one or more processors operatively connected to the one or more memories.

The one or more processors are configured to allow the device to perform a detection of a beam failure, transmit a beam failure recovery request (BFRQ), and receive a response to the BFRQ. The detection of the beam failure is related to at least one specific RS, and the at least one specific RS is related to a specific control resource set (CORESET) group of a plurality of CORESET groups.

In another aspect of the present disclosure, there are provided one or more non-transitory computer readable mediums storing one or more instructions.

The one or more instructions executable by one or more processors allow a user equipment (UE) to perform a detection of a beam failure, transmit a beam failure recovery request (BFRQ), and receive a response to the BFRQ. The detection of the beam failure is related to at least one specific RS, and the at least one specific RS is related to a specific control resource set (CORESET) group of a plurality of CORESET groups.

Advantageous Effects

According to an embodiment of the present disclosure, beam failure detection (BFD) is performed on RSs related to a specific CORESET group. Thus, when a UE receiving multi-DCI from a plurality of TRPs detects a beam failure, a BFD target is limited to RSs related to a specific TRP transmitting important control information, and at the same time reliability for the transmission of the important control information can be secured.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8 illustrates an example of a UL BM procedure using an SRS.

FIG. 9 illustrates an example of downlink transmission/reception operation.

FIG. 10 illustrates an example of an uplink transmission/reception operation to which a method described in the present disclosure is applicable.

FIG. 11 illustrates an example of a transmission/reception method for reliability enhancement using transmission in multiple TRPs.

FIG. 12 illustrates a beam failure recovery related operation to which a method described in the present disclosure is applicable.

FIG. 13 illustrates an example of signaling between a UE and a base station to which a method described in the present disclosure is applicable.

FIG. 14 is a flow chart illustrating a method of performing, by a UE, a beam failure recovery procedure in a wireless communication system according to an embodiment of the present disclosure.

FIG. 15 is a flow chart illustrating a method of performing, by a base station, a beam failure recovery procedure in a wireless communication system according to another embodiment of the present disclosure.

FIG. 16 illustrates a communication system 1 applied to the present disclosure.

FIG. 17 illustrates wireless devices applicable to the present disclosure.

FIG. 18 illustrates a signal process circuit for a transmission signal.

FIG. 19 illustrates another example of a wireless device applied to the present disclosure.

FIG. 20 illustrates a hand-held device applied to the present disclosure.

MODE OF DISCLOSURE

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-TDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) a ULtra-reliable and low latency communications (URLLC) area.

Some use cases may require multiple areas for optimization, and other use case may be focused on only one key performance indicator (KPI). 5G support such various use cases in a flexible and reliable manner eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies may be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and 1-R2. The FR1 and the FR2 may be configured as in Table 1 below. Furthermore, the FR2 may mean a millimeter wave (mmW).

TABLE 2

| Frequency Range Designation | Corresponding Fequency Range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480\cdot 10^3$, and $N_f=4096$. Downlink and uplink transmissions is constituted of a radio frame with a period of $T_f=(\Delta f_{max} N_f/100)\cdot T_s=10$ ms. Here, the radio frame is constituted of 10 subframes each of which has a period of $T_{sf}=(\Delta f_{max} N_f/1000)\cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_A = N_{TA} T_s$ earlier than the start of the downlink frame by the UE.

For numerology μ, slots are numbered in ascending order of $n_s^\mu \in \{0, \ldots, N_{subframe}^{slots,\mu}-1\}$ in the subframe and in ascending order of $n_{s,f}^\mu \in \{0, \ldots, N_{frame}^{slots,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu}N_{sc}^{RB}$ subcarriers on a frequency domain, each subframe consisting of $14 \cdot 2\mu$ OFDM symbols, but the present disclosure is not limited thereto.

In the NR system, a transmitted signal is described by one or more resource grids, consisting of $N_{RB}^{\mu}N_{sc}^{RB}$ subcarriers, and $2^{\mu}N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where k=0, . . . , $N_{RB}^{\mu}N_{sc}^{RB}-1$ is an index on a frequency domain, and l̄= 0, . . . , $2^{\mu}N_{symb}^{(\mu)}-1$ refers to a location of a symbol in a subframe. The index pair (k,l̄) is used to refer to a resource element in a slot, where l=0, . . . , $N_{symb}^{\mu}-1$.

The resource element (k,l̄) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for 1-R1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

-- ASN1START
-- TAG-TCI-STATE-START
TCI-State ::=      SEQUENCE {
  tci-StateId         TCI-StateId,
  qcl-Type1           QCL-Info,
  qcl-Type2           QCL-Info
  ...
}
QCL-info ::=       SEQUENCE {
  cell                ServCellIndex TABLE 5-continued bwp-Id              BWP-Id
  referenceSignal     CHOICE {
    csi-rs              NZP-CSI-RS-ResourceId,
    ssb                 SSB-Index
  },
  qcl-Type            ENUMERATED {typeA, typeB, typeC, typeD},
  ...
}
-- TAG-TCI-STATE-STOP
-- ASN1STOP In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIG. 8 illustrates an example of a UL BM procedure using a SRS.

More specifically, (a) of FIG. 8 illustrates an Rx beam determination procedure of a base station, and (a) of FIG. 8 illustrates a Tx beam sweeping procedure of a UE.

FIG. 9 illustrates an example of downlink transmission/reception operation.

A base station may schedule downlink transmission such as frequency/time resources, a transport layer, a downlink precoder, MCS, and the like (S910). As an example, the base station may determine a beam for transmitting a PDSCH to a UE.

The UE may receive downlink control information (DCI: Downlink Control Information) for downlink scheduling (i.e., including scheduling information of the PDSCH) on a PDCCH from the base station (S920).

DCI format 1_0 or DCI format 1_1 may be used for downlink scheduling, and DCI format 1_1 may include the following information. For example, DCI format 1_1 may include at least one of a DCI format identifier, a bandwidth part indicator, frequency domain resource assignment, time domain resource assignment, a PRB bundling size indicator, a rate matching indicator, ZP CSI-RS trigger, antenna port(s), transmission configuration indication (TCI), an SRS request, and demodulation reference signal (DMRS) sequence initialization.

In particular, the number of DMRS ports can be scheduled, and SU (single-user)/MU (multi-user) transmission scheduling can be performed according to each state indicated in the antenna port(s) field.

In addition, the TCI field consists of 3 bits, and the QCL for the DMRS may be dynamically indicated by indicating a maximum of 8 TCI states according to the TCI field value.

The UE may receive downlink data from the base station on the PDSCH (S930).

When the UE detects a PDCCH including DCI format 1_0 or 1_1, the UE may decode the PDSCH according to an indication by the corresponding DCI. Here, when the UE receives a PDSCH scheduled by DCI format 1, the UE may set a DMRS configuration type by a higher layer parameter 'dmrs-Type', and the DMRS type is used to receive the PDSCH. In addition, the UE may set the maximum number of DMRS symbols front-loaded for the PDSCH by a higher layer parameter 'maxLength'.

In the case of DMRS configuration type 1, when a single codeword is scheduled for the UE and an antenna port mapped with an index of {2, 9, 10, 11 or 30} is specified, or two codewords are scheduled for the UE, the UE assumes that all remaining orthogonal antenna ports are not associated with PDSCH transmission to another UE. In the case of DMRS configuration type 2, if a single codeword is scheduled for the UE and an antenna port mapped with an index of {2, 10 or 23} is specified, or if two codewords are scheduled for the UE, the UE assumes that all the remaining orthogonal antenna ports are not associated with PDSCH transmission to another UE.

When the UE receives the PDSCH, it may assume precoding granularity P' to be consecutive resource blocks in the frequency domain. Here, P' may correspond to one of {2, 4, broadband}. If P' is determined to be wideband, the UE does not expect to be scheduled with non-contiguous PRBs and the UE may assume that the same precoding is applied to allocated resources. On the other hand, if P' is determined as any one of {2, 4}, a precoding resource block group (PRG) is divided into P' consecutive PRBs. The actual number of consecutive PRBs in each PRG may be one or more. The UE may assume that the same precoding is applied to consecutive downlink PRBs in the PRG.

In order for the UE to determine a modulation order, a target code rate, and a transport block size in the PDSCH, the UE may first read a 5-bit MCD field in the DCI and determine the modulation order and the target code rate. Then, the UE may read a redundancy version field in the DCI and determine a redundancy version. In addition, the UE may determine the transport block size using the number of layers and the total number of allocated PRBs before rate matching.

FIG. 10 illustrates an uplink transmission/reception operation to which the method proposed in this disclosure may be applied.

Referring to FIG. 10, a BS schedules uplink transmission such as a frequency/time resource, a transport layer, an uplink precoder, and an MCS (S1010). In particular, the BS may determine a beam for a UE to transmit a PUSCH.

The UE receives a DCI for uplink scheduling (i.e., including scheduling information of the PUSCH) on a PDCCH from the BS (S1020).

For uplink scheduling, DCI format 0_0 or 0_1 may be used. In particular, DCI format 0_1 includes the following information.

DCI format identifier (identifier for DCI formats), UL/SUL (supplementary uplink) indicator (UL/SUL indicator), bandwidth part indicator, frequency domain resource assignment, time domain resource assignment, frequency hopping flag, modulation and coding scheme (MCS), SRS resource indicator (SRI), precoding information and number of layers, antenna port(s), SRS request, DMRS sequence initialization, uplink shared channel (UL-SCH) indicator.

In particular, SRS resources configured in the SRS resource set associated with the higher layer parameter 'usage' may be indicated by an SRS resource indicator field. In addition, 'spatialRelationInfo' may be set for each SRS resource, and the value may be one of {CRI, SSB, SRI}.

The UE transmits uplink data to the BS on PUSCH (S1030).

When the UE detects a PDCCH including DCI format 0_0 or 0_1, it transmits a corresponding PUSCH according to an indication by the corresponding DCI.

For PUSCH transmission, two transmission schemes are supported: codebook-based transmission and non-codebook-based transmission.

i) When the higher layer parameter 'txConfig' is set to 'codebook', the UE is set to codebook-based transmission. Meanwhile, when the higher layer parameter 'txConfig' is set to 'nonCodebook', the UE is set to non-codebook-based transmission. If the higher layer parameter 'txConfig' is not set, the UE does not expect to be scheduled by DCI format 0_1. When the PUSCH is scheduled by DCI format 0_0, PUSCH transmission is based on a single antenna port.

In the case of codebook-based transmission, the PUSCH may be scheduled by DCI format 0_0, DCI format 0_1 or semi-statically. When the PUSCH is scheduled by DCI format 0_1, the UE determines a PUSCH transmission precoder based on SRI, TPMI (Transmit Precoding Matrix Indicator) and transmission rank from DCI, as given by the SRS resource indicator field and the precoding information and number of layers field. The TPMI is used to indicate a precoder to be applied across an antenna port, and corresponds to an SRS resource selected by the SRI when multiple SRS resources are configured. Alternatively, when a single SRS resource is configured, the TPMI is used to indicate a precoder to be applied across the antenna port and corresponds to the single SRS resource. A transmission precoder is selected from the uplink codebook having the same number of antenna ports as the higher layer parameter 'nrofSRS-Ports'.

When the higher layer parameter 'txConfig' set to 'codebook' in the UE is configured, at least one SRS resource is configured in the UE. The SRI indicated in slot n is associated with the latest transmission of the SRS resource identified by the SRI, and here, the SRS resource precedes a PDCCH carrying the SRI (i.e., slot n).

ii) In the case of non-codebook-based transmission, the PUSCH may be scheduled by DCI format 0_0, DCI format 0_1 or semi-statically. When multiple SRS resources are configured, the UE may determine the PUSCH precoder and transmission rank based on the wideband SRI, and here, the SRI is given by the SRS resource indicator in the DCI or by the higher layer parameter 'srs-ResourceIndicator'. The UE uses one or multiple SRS resources for SRS transmission, and here, the number of SRS resources may be configured for simultaneous transmission within the same RB based on UE capability. Only one SRS port is configured for each SRS resource. Only one SRS resource may be set as the higher layer parameter 'usage' set to 'nonCodebook'. The maximum number of SRS resources that may be configured for non-codebook-based uplink transmission is 4. The SRI indicated in slot n is associated with the latest transmission of the SRS resource identified by the SRI, and here, the SRS transmission precedes the PDCCH carrying the SRI (i.e., slot n).

Multi-Transmission/Reception Point (TRP) Related Operation

A technique of Coordinated Multi Point (CoMP) refers to a scheme of effectively controlling interference multiple BS exchanges or utilizes channel information (e.g., RI/CQI/PMI/LI, etc.) fed back from the UE (e.g., uses the X2 interface) or transmits the channel information in coordination with the UE. According to a scheme using the channel information fed back from the UE, types of CoMP may be classified into Joint transmission (JT), Coordinated scheduling (CS), Coordinated beamforming (CB), dynamic point selection (DPS), dynamic point blanking (DPB), etc.

M-TRP (Multiple TRP) Transmission

An M-TRP transmission scheme in which M TRPs transmit data to one user equipment (UE) may be largely divided into two types, eMBB M-TRP transmission which is a scheme for increasing a transmission rate and URLLC M-TRP transmission which is a scheme for increasing a reception success rate and reducing latency.

Further, in terms of downlink control information (DCI) transmission, the multiple (M)-TRP transmission scheme may be divided into i) a multiple (M)-DCI based M-TRP transmission scheme in which each TRP transmits different DCI and ii) a single (S)-DCI based M-TRP transmission scheme in which one TRP transmits the DCI. As an example, in the case of the S-DCI, since all scheduling information for data transmitted by M TRPs should be delivered through one DCI, the S-DCI may be used in an ideal backhaul (BH) environment in which two TRPs may be dynamically coordinated with each other.

In TDM based URLLC, standardization for scheme 3/4 is being discussed. Specifically, scheme 4 means a scheme in which one TRP transmits the TB in one slot and has an effect of increasing a data reception probability through the same TB received from multiple TRPs in multiple slots. Unlike this, scheme 3 means a scheme in which one TRP transmits the TB through several consecutive OFDM symbols (i.e., symbol group), and may be configured in such a manner that multiple TRPs transmit the same TB through different symbol groups in one slot.

Further, the UE may recognize PUSCH (or PUCCH) scheduled by DCI received by different CORESETs (or CORESETs which belong to different CORESET groups) as PUSCH (or PUCCH) transmitted to different TRPs or PUSCH (or PUCCH) of different TRPs. Further, a scheme for UL transmission (e.g., PUSCH/PUCCH) transmitted to different TRPs may be applied equally even to UL transmission (e.g., PUSCH/PUCCH) transmitted to different panels which belong to the same TRP.

Further, MTRP-URLLC may mean that M TRPs transmit the same transport block (TB) by using different layers/times/frequencies. It may be assumed that a UE which is configured with an MTRP-URLLC transmission scheme is indicated with multiple TCI state(s) through the DCI and data received by using a QCL RS of each TCI state are the same TB. On the contrary, MTRP-eMBB may mean that M TRPs transmit different TBs by using different layers/times/frequencies. It may be assumed that a UE which is configured with an MTRP-eMBB transmission scheme is indicated with multiple TCI state(s) through the DCI and the data received by using the QCL RS of each TCI state are different TBs. In this regard, as the UE separately uses an RNTI configured for a purpose of MTRP-URLLC and an RNTI configured for a purpose of MTRP-eMBB, the UE may determine/decide whether the corresponding M-TRP transmission, URLLC transmission or eMBB transmission. That is, when CRC masking of the DCI received by the UE is performed by using the RNTI configured for the purpose of the MTRP-URLLC, this may correspond to the URLLC transmission and when the CRC masking of the DCI is performed by using the RNTI configured for the purpose of the MTRP-URLLC, this may correspond to the eMBB transmission.

Description of Multiple DCI Based NCJT/Single DCI Based NCJT

Non-coherent joint transmission (NCJT) is a method in which multiple transmission points (TPs) transmit data to one user equipment (UE) by using the same time frequency, and the TPs mutually transmit the data to different layers by using different Demodulation Multiplexing Reference Signal (DMRS) ports. The TP delivers data scheduling information to a UE that performs NCJT reception through downlink control information (DCI), and in this case, a scheme in which each TP which participates in the NCJT delivers scheduling information data transmitted thereby through the DCI is referred to as multi DCI based NCJT. Since each of N TPs which particulate NCJT transmission transmits, to the UE, DL grant DCI and PDSCH, the UE receives, from N TPs, N DCIs and N PDSCHs.

Unlike this, a scheme in which one representative TP delivers scheduling information for data transmitted thereby and data transmitted by another TP through one DCI is referred to as single DCI based NCJT. In this case, N TPs transmit one PDSCH, but each TP transmits only some layers of multiple layers constituting one PDSCH. For example, when 4-layer data is transmitted, TP 1 transmits 2 layers and TP 2 transmits, to the UE, 2 remaining layers.

Description of Partially Overlapped NCJT

Further, the NCJT is divided into fully overlapped NCJT in which time frequency resources transmitted by respective TPs are fully overlapped and partially overlapped NCJT in which only some time frequency resources are overlapped. That is, in the case of the partially overlapped NCJT, both transmission data of TP1 and TP2 are transmitted in some time frequency resources, and only one TP of TP1 or TP2 transmits data in the remaining time frequency resources.

Reliability Enhancement Scheme in Multi-TRP

As a transmission/reception method for reliability enhancement using transmission in multiple TRPs, two following methods may be considered.

FIG. 11 illustrates an example of a transmission/reception method for reliability enhancement using transmission in multiple TRPs.

The example of (a) of FIG. 11 illustrates a case where layer groups transmitting the same codeword (CW)/TB correspond to different TRPs. In this case, the layer group may mean a certain layer set constituted by one layer or one or more layers. In this case, there is an advantage in that a quantity of transmission resources increases due to multiple layers and robust channel coding robust of a low coding rate may be used for the transport block (TB) through the increased transmission resource quantity and further, since channels from multiple TRPs are different, reliability enhancement of a received signal may be expected based on a diversity gain.

The example of (b) of FIG. 11 illustrates an example of transmitting different CWs through layer groups corresponding to different TRPs. In this case, it may be assumed that TBs corresponding to CW #1 and CW #2 of the figure are the same as each other. Accordingly, the example may be regarded as an example of repeated transmission of the same TB. The case of (b) of FIG. 11 may have a disadvantage that the coding rate corresponding to the TB is high as compared with the case of (a) of FIG. 11. However, there is an advantage in that the coding rate may be adjusted by indicating different redundancy version (RV) values for encoding bits generated from the same TB according to a channel environment or a modulation order of each CW may be controlled.

In (a) of FIG. 11(*a*)/(b) of FIG. 11 above, as the same TB is repeatedly transmitted through different layer groups and different TRPs/panels transmit each layer group, a data reception probability may be increased and this is referred to as an SDM based M-TRP URLLC transmission scheme. Layers which belong to different layer groups are transmitted through DMRS ports which belong to different DMRS CDM groups, respectively.

Further, the above-described contents related to multiple TRPs are described based on a spatial division multiplexing (SDM) scheme using different layers, but this may be, of course, extensively applied even to a frequency division multiplexing (FDM) scheme based on different frequency domain resources (e.g., RB/PRB (set) and/or a time division multiplexing (TDM) scheme based on different time domain resources (e.g., slot, symbol, sub-symbol).

Hereafter, discussed contents related to Multi-TRP is described.

Schemes for multi-TRP based URLLC, scheduled by single DCI at least, are clarified as following.

Scheme 1 (SDM): n (n<=Ns) TCI states within the single slot, with overlapped time and frequency resource allocation Scheme 1a: Each transmission occasion is a layer or a set of layers of the same TB, with each layer or layer set is associated with one TCI and one set of DMRS port(s). Single codeword with one RV is used across all spatial layers or layer sets. From the UE perspective, different coded bits are mapped to different layers or layer sets with the same mapping rule as in Rel-15.

Scheme 1b: Each transmission occasion is a layer or a set of layers of the same TB, with each layer or layer set is associated with one TCI and one set of DMRS port(s). Single codeword with one RV is used for each spatial layer or layer set. The RVs corresponding to each spatial layer or layer set can be the same or different.

Scheme 1c: One transmission occasion is one layer of the same TB with one DMRS port associated with multiple TCI state indices, or one layer of the same TB with multiple DMRS ports associated with multiple TCI state indices one by one.

For Scheme 1a and 1c, the same MCS is applied for all layers or layer sets.

In the case of Scheme 1b, the same or different MCS/modulation order may be discussed for different layers or layer sets.

Scheme 2 (FDM): n (n<=Ns) TCI states within the single slot, with non-overlapped frequency resource allocation Each non-overlapped frequency resource allocation is associated with one TCI state.

Same single/multiple DMRS port(s) are associated with all non-overlapped frequency resource allocations.

Scheme 2a: Single codeword with one RV is used across full resource allocation. From UE perspective, the common RB mapping (codeword to layer mapping) is applied across full resource allocation.

Scheme 2b: Single codeword with one RV is used for each non-overlapped frequency resource allocation. The RVs corresponding to each non-overlapped frequency resource allocation can be the same or different.

For scheme 2a, same MCS is applied for all non-overlapped frequency resource allocations.

In the case of Scheme 2b, the same or different MCS/modulation order may be discussed for different non-overlapping frequency resource allocation.

Details of a frequency resource allocation mechanism for FDM 2a/2b related to allocation granularity and time domain allocation may be discussed.

Scheme 3 (TDM): n (n<=Nt1) TCI states within the single slot, with non-overlapped time resource allocation Each transmission occasion of the TB has one TCI and one RV with the time granularity of mini-slot.

All transmission occasion (s) within the slot use a common MCS with same single or multiple DMRS port(s).

RV/TCI state can be same or different among transmission occasions.

Scheme 4 (TDM): n (n<=Nt2) TCI states with K (n<=K) different slots.

Each transmission occasion of the TB has one TCI and one RV.

All transmission occasion (s) across K slots use a common MCS with same single or multiple DMRS port(s).

RV/TCI state can be same or different among transmission occasions.

M-TRP/panel based URLLC schemes should be compared in terms of improved reliability, efficiency, and specific impact. For reference, supporting a layer number per TRP may be discussed.

A TCI indication framework should be at least strengthened in Rel-16 for eMBB.

Each TCI codepoint of the DCI may correspond to one or two TCI states. When two TCI states are activated within the TCI codepoint, each TCI state at least corresponds to one CDM group for DMRS type 1.

In the TRP related description in the disclosure, the TRP may be replaced with a base station, a transmission point (TP), a cell (e.g., macro cell/small cell/pico cell), an antenna array, or a panel, and appreciated.

Beam Failure Recovery (BFR)

In performing a DL/UL beam management process, a beam mismatch problem may occur depending on configured periodicity of beam management. In particular, if a radio channel environment is changed because a UE moves its location or rotates or due to a movement of a surrounding object (e.g., an LoS environment is changed into a non-LoS environment because a beam is blocked), an optimum DL/UL beam pair may be changed. In general, such a change may be said that a beam failure event has occurred when tracking fails in a beam management process performed by network indication. A UE may determine whether such a beam failure event occurs through reception quality of a downlink RS. A report message for such a situation or a message (called a beam failure recovery request (BFRQ) message) for a beam recovery request needs to be delivered from a UE. A base station that has received such a message may perform beam recovery through various processes, such as beam RS transmission or a beam reporting request for the beam recovery. Such a series of beam recovery process is called beam failure recovery (BFR). In Rel-15 NR, a beam failure recovery (BFR) process for a PCell or a PScell (both are special cells (also called an SpCell)) in which a contention based PRACH resource is always present has been standardized. The corresponding procedure is an operation within a serving cell, is configured as follows as a beam failure detection (BFD) process of a UE, a BFRQ process, and a process of monitoring, by a UE, a response of a base station to a BFRQ (Reference: 3GPP TS38.213, TS38.321, TS38.331).

Beam Failure Detection (BFD)

If all PDCCH beams have a predetermined quality value (Q_out) or less, it is said that one beam failure instance has occurred (in this case, the quality is based on a hypothetical block error rate (BLER): That is, assuming that control information has been transmitted in a corresponding PDCCH, the probability that the demodulation of corresponding information will fail.

In this case, one or a plurality of search spaces in which a PDCCH will be monitored may be configured in a UE. All the PDCCH beams may be differently configured for each search space. In this case, this means that all the beams have a BLER threshold or less. The following two methods are supported as a criterion for determining, by a UE, a BFD RS.

[Implicit configuration of BFD RSs] a control resource set (refer to CORESET [TS38.213, TS38.214, TS38.331]) ID, that is, a resource region in which a PDCCH may be transmitted is configured in each search space. QCLed RS information (e.g., CSI-RS resource ID, SSB ID) from a spatial RX parameter viewpoint may be indicated/configured for each CORESET ID (in the NR standard, a QCLed RS is indicated/configured through transmit configuration information indication). In this case, the QCLed RS (i.e., QCL Type D in TS38.214) from the spatial RX parameter viewpoint means that a method of notifying, by a base station, a UE that the UE has to use (or may use) a beam used in corresponding spatially QCLed RS reception in corresponding PDCCH DMRS reception. As a result, from a base station viewpoint, this method is a method of notifying a UE that the UE has to perform transmission by applying the same transmission beam or a similar transmission beam (e.g., when beam directions are the same/similar, but beam widths are different) between spatially QCLed antenna ports.

[Explicit configuration of BFD RSs] a base station may explicitly configure a beam RS(s) for the use (beam failure detection). In this case, a corresponding beam RS(s) corresponds to the 'all PDCCH beam'.

Whenever an event in which a hypothetical BLER measured based on a BFD RS(s) in a UE physical layer is deteriorate to a specific threshold or more occurs, what beam failure instance (BFI) has occurred is notified through a MAC sublayer. When a BFI occurs as much as a given number (beamFailureInstanceMaxCount) within a given time (BFD timer), a UE MAC sublayer determines that a beam failure has occurred and initiates a related RACH operation.

Hereinafter, a MAC layer operation related to BFD is described.

MAC Entity:

1> when beam failure instance indication is received in lower layers:

2> starts or starts again beamFailureDetectionTimer.

2> increases BFI_COUNTER by 1.

2> when BFI_COUNTER>=beamFailureInstanceMaxCount:

3> initiate a random access procedure in a SpCell.

1> when beamFailureDetectionTimer expires; or

1> when beamFailureDetectionTimer, beamFailureInstanceMaxCount or a reference signal (any of the reference signals used for beam failure detection) used to detect a beam failure is reconfigured by a higher layer:

2> configures BFI_COUNTER to 0.

1> when a random access procedure is successfully completed:

2> configures BFI_COUNTER to 0.

2> stops (configured) beamFailureRecoveryTimer.

2> considers that the beam failure recovery procedure has been successfully completed.

BFRQ (Based on PRACH): New Beam Identification+PRACH Transmission

As described above, when a specific number of BFIs or more occur, a UE may determine that a beam failure has occurred, and may perform a beam failure recovery operation. As an example of the beam failure recovery operation, a beam failure recovery request (BFRQ) operation based on a RACH procedure (i.e., PRACH) may be performed. Hereinafter, a corresponding BFRQ procedure is specifically described.

When a BF occurs in a corresponding UE, a base station may configure an RS list (candidateBeamRSList) corresponding to candidate beams which may be replaced as RRC. Dedicated PRACH resources may be configured for corresponding candidate beams. In this case, the dedicated PRACH resources are non-contention based PRACH (also called contention free PRACH) resources. If a beam is not found in the corresponding list, a beam is selected among pre-configured SSB resources and a contention based PRACH is transmitted. A detailed procedure is as follows.

Step 1) a UE finds a beam having a predetermined quality value (Q_in) or more among RSs configured as a candidate beam RS set by a base station.

If one beam RS is greater than a threshold, a corresponding beam RS is selected.

If a plurality of beam RSs is greater than a threshold, given one of the corresponding beam RSs is selected If a beam greater than a threshold is not present, Step 2 is performed.

Note1: In this case, beam quality is based on RSRP.

Note2: the RS beam set configured by the base station includes three cases.

1) All beam RSs within the RS beam set are configured as SSBs

2) All beam RSs within the RS beam set are configured as CSI-RS resources

3) Beam RSs within the RS beam set are configured as SSBs and CSI-RS resources

Step 2) A UE finds a beam having a predetermined quality value (Q_in) or more among SSBs (related to a contention based PRACH resource)

If one SSB is greater than a threshold, a corresponding beam RS is selected.

If a plurality of SSB is greater than a threshold, given one of corresponding beam RSs is selected.

If a beam greater than a threshold is not present, Step 3 is performed.

Step 3) A UE selects a given SSB among SSBs (connected to a contention based PRACH resource)

The UE transmits, to a base station, a PRACH resource & preamble that has been connection configured directly or indirectly to the beam RS (CSI-RS or SSB) selected in the above process.

In this case, the direct connection configuration is used in the case of the following 1) or 2).

1) If a contention-free PRACH resource & preamble is configured for a specific RS with respect to a candidate beam RS set separately configured for BFR use, 2) If a (contention based) PRACH resource & preamble mapped to SSBs generally configured for other use, such as random access, in a one-to-one manner In this case, the indirect connection configuration is used in the following cases.

If a contention-free PRACH resource & preamble is not configured for a specific CSI-RS within a candidate beam RS set separately configured for BFR use.

In this case, a UE selects a (contention-free) PRACH resource & preamble connected to SSB designed to be received through the same reception beam as a corresponding CSI-RS (i.e., quasi-co-located (QCLed) with respect to spatial Rx parameter).

Monitoring of gNB's Response to the BFRQ

A UE monitors the replay of a base station (gNB) for corresponding PRACH transmission.

In this case, a response to a contention-free PRACH resource & preamble is transmitted in a PDCCH masked with a C-RNTI, and is separately received in a RRC-configured search space for BFR.

The search space is configured in a specific CORESET (for BFR).

A CORESET (e.g., CORESET 0 or CORESET 1) and search space configured for a common contention PRACH based random access process is used for a response to a contention PRACH without any change.

If a reply is not present for a given time, the UE repeats a new beam identification & selection process and a BFRQ & monitoring gNB's response process.

The process may be performed until PRACH transmission reaches a preset maximum number N_max or a configured timer (BFR timer) expires.

When the timer expires, the UE stops contention free PRACH transmission, but may perform contention based PRACH transmission based on the selection of an SSB until N_max is reached.

FIG. 12 is a diagram for describing a beam failure recovery-related operation to which a method proposed in the present disclosure may be applied. Specifically, FIG. 12 illustrates a beam failure recovery operation in a primary cell (PCell).

Beam Failure Recovery (in 3GPP NR Rel-16)

In relation to the application of the aforementioned PRACH-based BFR procedure, the following contents may be considered. In the case of a PRACH-based BFR procedure to which a carrier aggregation (CA) is applied, an SCell may not have an UL carrier. Although an SCell has an UL carrier, it has technical limits in that a contention based PRACH cannot be configured. Accordingly, a PRACH-based BFR procedure to which a carrier aggregation (CA) is applied is limitedly applied to only a PCell or a PSCell.

Due to limits in the application of the aforementioned PRACH-based BFR procedure, the following problems occur. If a PCell is operated in a low frequency band (e.g., 6 GHz or less) and a high frequency band (e.g., 30 GHz) is to be operated as an SCell, there is a problem in that a BFR is not supported in the high frequency band in which BFR support is more importantly affected.

For the above reason, in Rel-16 NR MIMO work item, standardization for a BFR report for a secondary cell (SCell) is in progress. Accordingly, the following contents may be considered.

UL transmission is impossible in a corresponding SCell with respect to at least DL only SCell. Accordingly, a (dedicated) PUCCH resource(s) used when a base station is notified that a beam failure has occurred in a corresponding SCell may be configured in a special cell (SpCell). A beam failure recovery request (BFRQ) for the SCell may be performed based on the configured PUCCH resources. Hereinafter, a PUCCH configured for the beam failure recovery of an SCell is referred to as a BFR-PUCCH for convenience of description.

A role of a BFR-PRACH is to transmit both 'the occurrence of a beam failure+new beam RS (set) information' to a base station.

In contrast, a role of a BFR-PUCCH is to notify a base station of only 'the occurrence of a beam failure for an SCell(s)'. Detailed information related to an occurred beam failure may be transmitted as a subsequent report.

For example, a UE may transmit, to a base station, a MAC CE (or UCI) including information for at least one of the following i) to iii) as the subsequent report.

i) An SCell(s) in which a beam failure has occurred example: CC index(s)

ii) whether a new beam for an SCell(s) in which a beam failure has occurred is present iii) a corresponding beam RS ID(+quality) when a new beam is present In the case of the iii), information for quality (RSRP or SINR) of a new beam(s) according to a beam RS ID(s) may be included.

A subsequent beam report does not need to be always triggered. Specifically, after receiving a BFR-PUCCH, a base station may deactivate an SCell(s) in which a BFR configuration has been configured for a corresponding UE.

The above operation is for increasing UL resource utilization. Specifically, there is a case where several tens of SCells are connected to one PCell/PSCell, and there may be many UEs sharing one PCell/PSCell UL from a base station viewpoint. When even such a case is considered, it is preferred that the amount of UL resources reserved in each UE as SCell BFRQ use is minimized in a PCell/PSCell. Accordingly, after receiving a BFR-PUCCH, the base station may deactivate an SCell(s) in which a beam failure has occurred.

Control Resource Set (CORESET)

RRC configuration related to a CORESET is described below.

The IE ControlResourceSet is used to configure a time/frequency control resource set (CORESET) in which to search for downlink control information. Table 6 below shows an example of IE ControlResourceSet.

cce-REG-MappingType: Mapping of control channel elements (CCE) to resource element groups (REG) (see TS 38.211, clauses 7.3.2.2 and 7.4.1.3.2).

controlResourceSetId: Value 0 identifies the common CORESET configured in MIB and in ServingCellConfig-Common (controlResourceSetZero) and is hence not used here in the ControlResourceSet IE. Other values 1 to maxN-rofControlResourceSets-1 identify CORESETs configured by dedicated signaling or in SIB1. The controlResource-SetId is a unique ID among the BWPs of a serving cell.

duration: Contiguous time duration of the CORESET in number of symbols.

frequencyDomainResources: Frequency domain resources for the CORESET. Each bit corresponds to a group of 6 RBs, with grouping starting from the first RB group (see TS 38.213, clause 10.1) in the BWP. The first (left-most/most significant) bit corresponds to the first RB group in the BWP, and so on. A bit that is set to 1 indicates that this RB group belongs to the frequency domain resource of this CORESET. Bits corresponding to a group of RBs not fully contained in the bandwidth part within which the CORESET is configured are set to zero (see TS 38.211, clause 7.3.2.2).

interleaverSize: Interleaver-size (see TS 38.211, clause 7.3.2.2)

pdcch-DMRS-ScramblingID: PDCCH DMRS scrambling initialization (see TS 38.211, clause 7.4.1.3.1). When the field is absent, the UE applies the value of the physCellId configured for this serving cell.

precoderGranularity: Precoder granularity in frequency domain (see TS 38.211, clauses 7.3.2.2 and 7.4.1.3.2).

reg-BundleSize: Resource element groups (REGs) can be bundled to create REG bundles. This parameter defines the size of such bundles (see TS 38.211, clause 7.3.2.2).

shiftIndex: When the field is absent, the UE applies the value of the physCellId configured for this serving cell (see TS 38.211, clause 7.3.2.2).

TABLE 6

```
-- ASN1START
-- TAG-CONTROLRESOURCESET-START
ControlResourceSet ::=          SEQUENCE {
    controlResourceSetId            ControlResourceSetId,
    frequencyDomainResources        BIT STRING (SIZE (45)),
    duration                        INTEGER (1..maxCoReSetDuration),
    cce-REG-MappingType             CHOICE {
        interleaved                     SEQUENCE {
            reg-BundleSize                  ENUMERATED {n2, n3, n6 },
            interleaverSize                 ENUMERATED {n2, n3, n6},
            shiftIndex                      INTEGER(0..maxNrofPhysicalResourceBlocks-1)
OPTIONAL -- Need S
        },
        nonInterleaved                  NULL
    },
    precoderGranularity             ENUMERATED {sameAsREG-bundle, allContiguousRBs},
    tci-StatesPDCCH-ToAddList       SEQUENCE(SIZE (1..maxNrofTCI-StatesPDCCH)) OF TCI-
StateId OPTIONAL, -- Cond NotSIB1-initialBWP
    tci-StatesPDCCH-ToReleaseList   SEQUENCE(SIZE (1..maxNrofTCI-StatesPDCCH)) OF TCI-
StateId OPTIONAL, -- Cond NotSIB1-initialBWP
    tci-PresentInDCI                ENUMERATED {enabled }
OPTIONAL, -- Need S
    pdcch-DMRS-ScramblingID         INTEGER (0..65535)
OPTIONAL, -- Need S
    ...
}
-- TAG-CONTROLRESOURCESET-STOP
-- ASN1STOP
```

The definition of parameters related to Table 6 above may be as follows.

tci-PresentInDCI: This field indicates if TCI field is present or absent in DL-related DCI. When the field is absent, the UE considers the TCI to be absent/disabled. In case of cross carrier scheduling, the network sets this field to enabled for the ControlResourceSet used for cross carrier scheduling in the scheduling cell (see TS 38.214, clause 5.1.5).

tci-StatesPDCCH-ToAddList: A subset of the TCI states defined in pdsch-Config included in the BWP-DownlinkDedicated corresponding to the serving cell and to the DL BWP to which the ControlResourceSet belong to. They are used for providing QCL relationships between the DL RS(s) in one RS Set (TCI-State) and the PDCCH DMRS ports (see TS 38.213, clause 6.). The network configures at most maxNrofTCI-StatesPDCCH entries.

NotSIB1-initialBWP: The field is absent in SIB1 and in the PDCCH-ConfigCommon of the initial BWP in ServingCellConfigCommon, if SIB1 is broadcasted. Otherwise, it is optionally present.

The ControlResourceSetId is described in detail.

The ControlResourceSetId IE concerns a short identity (ID), used to identify a control resource set within a serving cell. The ControlResourceSetId=0 identifies the ControlResourceSet #0 configured via PBCH (MIB) and in controlResourceSetZero (ServingCellConfigCommon). The ID space is used across the BWPs of a Serving Cell. The number of CORESETs per BWP is limited to 3 (including common and UE-specific CORESETs).

Table 7 below shows an example of ControlResourceSetId IE.

TABLE 7

-- ASN1START
-- TAG-CONTROLRESOURCESETID-START
ControlResourceSetId ::= INTEGER
(0..maxNrofControlResourceSets-1)
-- TAG-CONTROLRESOURCESETID-STOP
-- ASN1STOP The IE ControlResourceSetZero is used to configure CORESET #0 of the initial BWP (see TS 38.213, clause 13). Table 8 below shows an example of IE ControlResourceSetZero.

TABLE 8

-- ASN1START
-- TAG-CONTROLRESOURCESETZERO-START
ControlResourceSetZero ::= INTEGER (0..15)
-- TAG-CONTROLRESOURCESETZERO-STOP
-- ASN1STOP The contents (3GPP system, frame structure, NR system, etc.) described above can be applied by being combined with methods to be described later in the present disclosure, or can be supplemented to clarify technical features of methods described in the present disclosure. Methods to be described below are distinguished merely for convenience of description. Therefore, it is obvious that partial configuration of any one method can be replaced by partial configuration of another method, or methods can be combined and applied.

The following methods 1) and 2) may be considered to support an approach called an independent layer joint transmission (ILJT) or a non-coherent joint transmission (NCJT) among approaches in which multiple TRPs/panels, etc. perform a joint transmission to a single UE.

1) A multi-PDCCH based approach in which multiple TRPs/panels each transmit PDCCH and jointly transmit data to a UE 2) A single PDCCH based approach in which only one TRP/panel transmits PDCCH, and multiple TRPs/panels/beams participate in PDSCH transmission to jointly transmit data.

If the multi-PDCCH based approach is applied, each TRP/panel may independently transmit DCI to the UE, and each independent PDSCH may be scheduled for each TRP/panel. There may occur an overlap in a resource domain (time/frequency domain) in which the corresponding PDSCHs are transmitted. The ILJT transmission may be supported in a way that some layer groups for the corresponding PDSCHs in the overlapped domain transmit a specific TRP/panel, and other layer group for the corresponding PDSCH transmits other TRP/panel. That is, each of different TRPs/panels in the same component carrier (CC)/bandwidth part (BWP) transmits the PDCCH, and PDSCHs scheduled via the corresponding PDCCHs may overlap on the time/frequency domain.

If the UE wants to support the operation even in a non-ideal backhaul environment where cooperation between TRPs/panels is difficult to achieve very closely, the time/frequency resource domains in which each TRP/panel can transmit the PDCCH shall be separated. Thus, in the NR system, control resource set (CORESET) groups to which each TRP/panel transmits the PDCCH may be separated.

If a beamforming scheme is applied for each PDCCH transmission, beams for different control resource sets (CORESETs) within each control resource set (CORESET) group may be differently configured/indicated. In this instance, the beam may be based on at least one of a transmission configuration indicator (TCI) state, source/QCL RS (e.g., CSI-RS/SSB), a spatial Tx filter, or a spatial Tx parameter.

In the above case, Type-D QCL RS (e.g., spatial relation related RS (e.g., CSI-RS/SSB)) indicated in the TCI state of the CORESET may be different. However, considering that control resource sets belonging to the same control resource set group are transmitted from the same TRP/panel, an operation related to Hybrid Automatic Repeat and request (HARQ), uplink control information (UCI) reporting handling, PUCCH/PUSCH collision handling, PDSCH rate matching, power control, etc. may be configured to be managed/performed for each control resource set group.

If a beam failure recovery (BFR) operation is applied to the above-described multi-PDCCH based NCJT environment as it is, the UE may operate as follows. If all the control resource sets belonging to a specific TRP are in a beam failure situation, but there is a control resource set that is not a beam failure (BF) among control resource sets belonging to other TRP, the UE does not decide it as a beam failure situation. As a result, the UE does not transmit a beam failure recovery request as long as all the control resource sets (of all the TRPs) are not in the beam failure situation.

In the situation described above, one of all beam failed TRPs may be a TRP (e.g., primary TRP) that is responsible for transmission for important control information such as a system information block (SIB), a random access (RA), and paging. In this case, even if (a specific beam of) the other TRP (e.g., secondary TRP) is in a non-beam failure situation, there is a problem in that the UE cannot receive the important control information.

The present disclosure proposes solutions to the above-described problems.

The following proposal methods (e.g., methods 1-1 and 1-2 of proposal 1/methods 2-1, 2-2 and 2-3 of proposal 2/methods 3-1, 3-2 and 3-3 of proposal 3/methods 4-1, 4-2 and 4-3 of proposal 4, etc.) are described based on a plurality of TRPs, but they can be equally applied to transmission across multiple panels.

The following may be considered in relation to multi-TRP based transmission/reception operations between a UE and a network side (e.g., base station, etc.) in the following proposal methods (e.g., methods 1-1 and 1-2 of proposal 1/methods 2-1, 2-2 and 2-3 of proposal 2/methods 3-1, 3-2 and 3-3 of proposal 3/methods 4-1, 4-2 and 4-3 of proposal 4, etc.).

That at least one TRP transmits a specific downlink channel/downlink signal (e.g., BFD related configuration, BFD RS, type-D QCL RS, response for BFRQ, . . . ) to the UE may mean that the network side (e.g., base station, etc.) related to the at least one TRP (e.g., managing the at least one TRP) transmits the specific downlink channel/downlink signal to the UE via/using the at least one TRP.

That the UE receives a specific downlink channel/downlink signal from at least one TRP may mean that the UE receives the specific downlink channel/downlink signal from the network side (e.g., base station, etc.) related to the at least one TRP (e.g., managing the at least one TRP) via/using the at least one TRP.

That the UE transmits a specific uplink channel/uplink signal (e.g., PUCCH, BFRQ, . . . ) to at least one TRP may mean that the UE transmits the specific uplink channel/uplink signal to the network side (e.g., base station, etc.) related to the at least one TRP (e.g., managing the at least one TRP) via/using the at least one TRP.

That at least one TRP receives a specific uplink channel/uplink signal from the UE may mean that the network side (e.g., base station, etc.) related to the at least one TRP (e.g., managing the at least one TRP) receives the specific uplink channel/uplink signal from the UE via/using the at least one TRP.

A control resource set (CORESET) group ID described/mentioned in the following proposal methods (e.g., methods 1-1 and 1-2 of proposal 1/methods 2-1, 2-2 and 2-3 of proposal 2/methods 3-1, 3-2 and 3-3 of proposal 3/methods 4-1, 4-2 and 4-3 of proposal 4, etc.) may mean index/identification information (e.g., ID), etc. for distinguishing a CORESET for each TRP/panel.

A CORESET group may be an index/identification information (e.g., ID), etc./a group of CORESET distinguished by the CORESET group ID/a union for distinguishing a CORESET for each TRP/panel. For example, the CORESET group ID may be specific index information defined within CORESET configuration. For example, the CORESET group may be configured/indicated/defined by an index defined within CORESET configuration for each CORESET.

And/or, the CORESET group ID may mean an index/identification information/an indicator, etc. for distinguishing/identifying between CORESETs configured/associated for each TRP/panel. The CORESET group ID described/mentioned in the present disclosure may be expressed by being replaced by a specific index/specific identification information/a specific indicator for distinguishing/identifying between CORESETs configured/associated for each TRP/panel.

The CORESET group ID, i.e., a specific index/specific identification information/a specific indicator for distinguishing/identifying between CORESETs configured/associated for each TRP/panel may be configured/indicated via higher layer signaling (e.g., RRC signaling)/L2 signaling (e.g., MAC-CE)/L1 signaling (e.g., DCI), etc. For example, it may be configured/indicated so that PDCCH detection for each TRP/panel is performed on a per CORESET group basis, and/or it may be configured/indicated so that uplink control information (e.g., CSI, HARQ-A/N, SR) and/or uplink physical channel resources (e.g., PUCCH/PRACH/SRS resources) for each TRP/panel is separated and managed/controlled on a per CORESET group basis, and/or HARQ process (and/or HARQ ACK/NACK transmission) for PDSCH/PUSCH, etc. scheduled for each TRP/panel may be managed on a per CORESET group basis.

[Proposal 1]

A UE performs a beam failure detection (BFD) only on specific CORESET group(s). In this instance, the specific CORESET group(s) may be CORESET group(s) (e.g., CORESET group in which CORESET group ID=0) corresponding to promised/defined/pre-configured CORESET group ID(s) or CORESET group(s) that a base station configures/designates (so that the base station performs the BFD).

The above method is configured so that the UE performs the BFD only on CORESET group(s) corresponding/associated to TRP(s) to send important information such as system information. Hence, if beams of the TRP(s) are in a beam failure situation, the UE may transmit a Beam Failure Recovery reQuest (BFRQ) to the base station (e.g., network side, . . . ).

Detailed methods (methods 1-1 and 1-2) of the proposal 1 are described below.

In the NR system, beam failure detection (BFD) may be performed in the following two approaches.

1) Implicit BFD RS determination
2) Explicit BFD RS determination

In relation to the proposal 1, the following methods may be considered for the two methods above.

[Method 1-1]

Hereinafter, a method related to the 1) implicit BFD RS determination approach is described.

If a base station does not separately configure/designate BFD RS(s), a UE may perform a beam failure detection (BFD) only on (Type-D) QCL RS(s) indicated in TCI state(s) related to specific CORESET group(s).

According to the existing method, the UE may operate as follows.

The UE checks a hypothetical block error rate (BLER) for (Type-D) QCL RS(s) indicated in TCI(s) of all CORESETs and decides that a beam failure occurs if all the CORESETs are in a beam failure situation, thereby increasing a beam failure instance (BFI) counter in a MAC sublayer.

Unlike the existing method, according to the Method 1-1, the UE may operate as follows.

The UE may operate to limit an operation (e.g., beam failure instance counting) related to the beam failure detection to TCI(s) belonging to specific CORESET group(s). That is, the UE may check a hypothetical BLER for (Type-D) QCL RS(s) indicated by TCI(s) of the specific CORESET group(s) and increase a beam failure instance counter if all the CORESETs included in the specific CORESET group(s) are in a beam failure situation.

[Method 1-2]

Hereinafter, a method related to the 1) explicit BFD RS determination approach is described.

A base station may configure BFD RS(s) to a UE via an RRC message. Afterward, the base station may update all or some of BFD RSs pre-configured to the UE via an MAC CE message.

More specifically, the UE/base station may operate based on at least one of the following method 1) or 2).

1) If TCI state(s) related to CORESETs belonging to specific CORESET group(s) is(are) updated via/using MAC CE, a method of updating one of BFD RS(s) to Type-D QCL RS of the TCI state(s) using the CORESET TCI may be considered. Specifically, the base station may update the TCI state(s) related to the CORESETs belonging to the specific CORESET group(s) via the MAC CE message. The UE receiving the MAC CE message may change one of the pre-configured BFD RS(s) to the updated Type-D QCL RS (i.e., spatial relation RS) of the TCI state(s).

If the plurality of BFD RSs are pre-configured, a BFD RS on which the update will be performed among the plurality of BFD RSs may be based on at least one of the following i), ii) or iii).

i) the same RS as the Type-D QCL RS of the TCI state before the update of the corresponding CORESET ii) RS having Type-D QCL relationship with the Type-D QCL RS of the TCI state before the update iii) BFD RS of a specific order (e.g., first BFD RS)

2) A method may be considered to indicate an update of the BFD RS(s) by adding an information field to a separate MAC CE message or a MAC CE message for updating CORESET TCI state(s).

In the latter case (i.e., MAC CE message for updating the CORESET TCI state), the information field within the MAC CE message may include indication information (e.g., indicator) about whether to update the BFD RS to (the Type D-QCL RS of) the TCI state(s) included in CORESET TCI state(s) update information. And/or, the indication information may include information about a BFD RS to be updated to the Type D-QCL RS of the TCI state(s) among pre-configured BFD RS(s).

And/or, the information field may separately include RS ID information (e.g., NZP-CSI-RS-ResourceId/SSB index) for the BFD RS to be updated, irrespective of (the Type D-QCL RS of) the TCI state(s) included in the CORESET TCI state(s) update information of the MAC-CE message.

The pre-defined explicit BFD RS determination method is a method of separately designating, by the base station, the RS to perform the BFD to the UE. According to the method, the technical problem of the present disclosure can be solved by configuring BFD RS(s) using only beams belonging to specific TRP(s). However, the beams of the specific TRP(s) shall be updated due to a movement of the UE, etc. In the existing system, CORESET TCI state(s) may be updated more dynamically via the MAC CE, but there is a limit in that the explicitly configured BFD RS cannot be dynamically updated via the MAC CE.

For example, in the case of 1) of the method 1-2, when PDCCH wants to be transmitted via the specific TRP that is RS #0, and transmitted via the specific TRP in which the beam is changed to RS #1, a CORESET TCI state(s) update indication will be performed (by the base station). Therefore, the BFD RS can be changed from RS #0 to RS #1 in conjunction with the corresponding indication. In the 2) of the method 1-2 that is a more flexible method, information about whether to update to RS #1 and/or information about whether to change to RS other than RS #1, etc. may be transmitted by being included in the MAC-CE for updating the CORESET TCI state(s), or may be transmitted via/using separate MAC-CE.

In the above-described proposal 1, if the beam failure situation occurs in the TRP to send important information, the UE may be configured to transmit the BFRQ. On the contrary, when only the TRP not to send important information is in the beam failure situation, the UE does not transmit the BFRQ, and thus the BFR may not be performed on the corresponding TRP. As a method to overcome the limit, the following methods are proposed.

[Proposal 2]

A UE constructs/determines a plurality of BFD RS sets (on a per CORESET group basis or according to base station configuration) and then performs the BFD on a per BFD RS set basis and determines whether there is BFI.

[Method 2-1]

If a base station does not separately configure/designate BFD RS(s), the UE may bundle (Type-D) QCL RS(s) indicated in TCI state(s) related to CORESET(s) belonging to the CORESET group for each CORESET group to construct/determine a BFD RS set.

[Method 2-2]

If the base station separately configures/designates BFD RS(s), the base station may separately configure/designate a plurality of BFD RS set(s).

[Method 2-3]

The base station may separately configure a BFD timer (e.g., beamFailureDetectionTimer) and/or a maximum BFI counter value (e.g., beamFailureInstanceMaxCount) per BFD RS set (via/using RRC/MAC-CE, etc.).

Alternatively, the base station may set a BFD timer (e.g., beamFailureDetectionTimer) and/or a maximum BFD counter value (e.g., beamFailureInstanceMaxCount) to one value. The base station may configure/indicate, to the UE, applying the same value (in relation to the timer and/or the BFI counter), irrespective of a BFD RS set ID (for BFD RS sets belonging to the same CC/BWP).

For example, if the importance of control information for which each TRP is responsible is different, the base station may set a maximum BFD counter value for the TRP sending the more important control information to be small. Hence, there is an effect in which the UE can transmit more rapidly the BFRQ.

If the proposal 2 is applied, the UE may perform the BFD per TRP. If the BFI counter reaches a maximum value or more, the UE transmits the BFRQ. In this instance, the base station needs to know in which TRP for the corresponding UE the beam failure has occurred. Thus, the following is proposed.

[Proposal 3]

If an BF event for a specific BFD RS set (or CORESET group) occurs (i.e., if a BFI counter is equal to or greater than a maximum value and the UE finds a new beam), the UE may transmit a BFRQ and implicitly/explicitly transfer (transmit), to the base station, information that the BFRQ is a BFRQ for which BFD RS set(s) (or CORESET group(s)). More specifically, some of the following methods may be used/applied.

[Method 3-1]

The base station may configure UL resource(s) for BFRQ distinguished every BFD RS set (or CORESET group). If an BF event for a specific BFD RS set (or CORESET group) occurs, the UE may transmit UL resource(s) for BFRQ configured for the specific BFD RS set (or CORESET group) (and/or the UE may transmit the BFRQ via the UL resource(s) for BFRQ). In the present embodiment, information on the BFD RS set (or CORESET group) related to the BFRQ may be implicitly transferred to the base station by the UL resource(s) for BFRQ.

[Method 3-2]

The UE may transmit by including BFD RS set IDs (or CORESET group IDs) generated by the BF and/or BFD RS set related information in UL resources for BFRQ.

[Method 3-3]

The UE may transmit MAC-CE or UCI having a form including BFD RS set ID(s) (or CORESET group ID(s)) and/or BFD RS set related information in which the BF occurs, via separate UL resources (assigned) after the BFRQ transmission.

For example, in the methods 3-1/3-2/3-3, the UL resources for BFRQ may be PRACH and/or PUCCH resources (see the explanation related to BFRQ described above).

[Proposal 4]

The methods 3-1/3-2/3-3 of the proposal 3 may be applied in various ways according to the cases related to the beam failure recovery.

[Method 4-1]

A method related to a BFR case for a special cell (SpCell) is described below.

For example, in the case of BFR for standardized SpCell in Rel-15, a PRACH is used as an UL resource for BFRQ. Only if a reference signal received power (RSRP) finds a new beam RS exceeding a threshold, a UE transmits a BFRQ from a PRACH resource connected to the new beam RS. That is, a base station knows, via the PRACH, a new beam RS ID as well as whether a BF event is generated. Thus, in such a case, the method 3-1 may be applied as follows. Specifically, the method 3-1 is applied to allocate separate PRACH resources (e.g., sequence, time/frequency location, transmission occasion) every BFD RS set (or CORESET group), and thus can send proposed information while minimizing changes in the existing system.

In this instance, the base station may allocate a BFRQ-PRACH resource every new beam candidate RS, and a new beam candidate RS set may be separately configured every BFD RS set (or CORESET group). If a beam failure occurs for a specific BFD RS set (or CORESET group), the UE receiving such a configuration finds UL resources for BFRQ only within a new beam candidate RS set configured for the specific BFD RS set (or CORESET group). That is, the UE may transmit a BFRQ related to the beam failure via a specific PRACH resource for BFRQ, and the specific PRACH resource for BFRQ may be one of PRACH resources for BFRQ related to a new beam candidate RS set configured to a BFD RS set (or CORESET group) in which the beam failure occurs.

As a result, the corresponding method obtains the same effect as the method 3-1. That is, the base station receiving (a BFRQ transmitted via) a specific UL resource for BFRQ from the UE can (implicitly) obtain whether a BF event occurs, and TRP information in which the BF event as well as the new beam RS ID occur.

[Method 4-2]

A method related to a BFR case for a secondary cell (SCell) is described below.

In the case of BFRQ for the SCell, even if the UE does not find a new beam (i.e., in a state where the new beam is not found), the UE may transmit the BFRQ. In this instance, information on the new beam (new beam RS information) may be separately reported via other resource not an UL resource for BFRQ (e.g., MAC-CE on PUSCH). In such a case, the method 3-1 can also be applied (i.e., configure a separate BFRQ-PUCCH resource every BFD RS set (or CORESET group)), but it may be more suitable to apply the method 3-2 and/or the method 3-3. In particular, the method 3-2 or the method 3-3 may be applied depending on a PUCCH format in which the BFRQ is transmitted. Specifically, the method 3-2 may be suitable for a format (e.g., PUCCH format 2, 3, 4) supporting more uplink control information (UCI) payload, and the method 3-3 may be suitable for a format (e.g., PUCCH format 0, 1) supporting less UCI payload.

[Method 4-3]

A method related to dedicated BFR-CORESET/search space (SS) configuration is described below.

In particular, if the method 3-1 and/or the method 3-2 is applied, a base station receiving the BFRQ can immediately know for which TRP a serving beam is in a beam failure situation. Through this, the base station can transmit PDCCH sending a response to a BFRQ at the corresponding TRP (using a new beam for the corresponding TRP).

In order to support such an operation, in particular, dedicated CORESET/search space (SS) receiving the response to the BFRQ is configured in a beam failure recovery process for the SpCell. Thus, in a multi-PDCCH environment, the BFR-CORESET/SS may be separately configured every BFD RS set (or CORESET group).

That is, a separate BFR-CORESET/SS may be configured to receive a PDCCH response of the bae station to the BFRQ for the BFD RS set (or CORESET group) every BFD RS set (or CORESET group or BFRQ-UL resource group) (upon the BFR for the SpCell). And/or, the BFR-CORESET/SS to receive the response to the BFRQ may be separately configured every BFRQ-UL resource group.

[Proposal 5]

A method related to separate ACK/NACK (A/N) codebook configuration is described below.

If a UE sends a BFRQ message to a base station based on the above-described proposal methods (e.g., the methods 1-1 and 1-2 of the proposal 1/the methods 2-1, 2-2 and 2-3 of the proposal 2/the methods 3-1, 3-2 and 3-3 of the proposal 3/the methods 4-1, 4-2 and 4-3 of the proposal 4, etc.), the UE may receive a PDCCH response of the base station to the BFRQ message and receive a PDSCH scheduled by the PDCCH. Afterward, the UE may report (i.e., transmit to the base station) A/N information (i.e., HARQ-ACK information) for the PDSCH.

In this instance, if an A/N codebook (i.e., HARQ-ACK codebook) for different TRPs is separately configured (e.g., A/N codebook for TRP 1 (e.g., TRP corresponding to CORESET group 0) and A/N codebook for TRP 2 (e.g., TRP corresponding to CORESET group 1)), it may be ambiguous that the UE shall transmit the HARQ-ACK information to the base station based on/carrying which codebook.

In this regard, in multiple DCI based M-TRP transmission, a separate A/N codebook operation method for each TRP may be as follows.

For example, the A/N codebook for TRP 1 (e.g., TRP corresponding to CORESET group 0) may consist of A/N information of PDSCH scheduled by DCI received based on a CORESET belonging to the CORESET group 0, or A/N information of PDSCH scheduled by DCI received based on other CORESET belonging to the CORESET group 0. In this instance, the UE may transmit A/N information based on the A/N codebook via one PUCCH resource.

For example, the A/N codebook for TRP 2 (e.g., TRP corresponding to CORESET group 1) may consist of A/N information of PDSCH scheduled by DCI received based on a CORESET belonging to the CORESET group 1, or A/N information of PDSCH scheduled by DCI received based on other CORESET belonging to the CORESET group 1. In this instance, the UE may transmit A/N information based on the A/N codebook via one PUCCH resource.

The following methods are proposed in relation to the ambiguity of the above-described A/N codebook.

[Method 5-1]

As in the proposal 1, it is assumed that the UE performs beam failure (BF) detection and BFRQ for only one CORESET group (e.g., group 0).

In this case, the UE may transmit A/N information to the base station based on/via/using 'an A/N codebook corresponding to the A/N information (i.e., the same as the A/N information) scheduled by DCI received based on other CORESET belonging to a CORESET group performing the BF detection'.

And/or, the UE may transmit A/N information to the base station based on/via/using 'an A/N codebook corresponding to the A/N information (i.e., the same as the A/N information) of PDSCH scheduled by DCI received based on other CORESET belonging to a CORESET group performing the BF detection and the BFRQ'.

That is, a CORESET group of BFR-CORESET for receiving the PDCCH response of the base station to the BFRQ message may be configured the same as the CORESET group (e.g., CORESET group 0) performing the BF detection.

[Method 5-2]

As in the proposal 2, it is assumed that the UE respectively performs BF detection and BFRQ for several CORESET groups (e.g., N CORESET groups). In this case, the UE may be configured with one BFR-CORESET. Alternatively, the UE may be configured with N BFR-CORESETs one-to-one corresponding to the N CORESET groups, in order to independently perform a BFRQ for each CORESET group.

Depending on the distinguishment of the BFR-CORESET configuration, the UE may determine a codebook of the A/N information through the following methods.

[Method 5-2a]

In the methods of the proposal 2, it is assumed that the UE is configured with one BFR-CORESET. In this case, the UE may transmit A/N information to the base station based on/via/using 'an A/N codebook corresponding to the A/N information (i.e., the same as the A/N information) scheduled by DCI received based on other CORESET belonging to a CORESET group in which the beam failure is detected'. And/or, the UE may transmit A/N information to the base station based on/via/using 'an A/N codebook corresponding to the A/N information (i.e., the same as the A/N information) of PDSCH scheduled by DCI received based on other CORESET belonging to a CORESET group in which the beam failure is detected'.

That is, a CORESET group of BFR-CORESET for receiving the PDCCH response of the base station to the BFRQ message may be configured the same as the CORESET group (e.g., CORESET group 0 or 1) in which the beam failure is detected. For example, if the beam failure is detected in CORESET group i, the CORESET group of BFR-CORESET may be determined as the CORESET group i.

[Method 5-2b]

In the methods of the proposal 2, it is assumed that the UE is configured with N BFR-CORESETs. In this case, since each BFR-CORESET is one-to-one corresponding to the CORESET group in which the beam failure is detected, each BFR-CORESET may belong to the CORESET group that is one-to-one corresponding to it. In this case, the UE may transmit A/N information to the base station based on/via/using 'an A/N codebook corresponding to the A/N information (i.e., the same as the A/N information) scheduled by DCI received based on other CORESET belonging to a CORESET group in which the beam failure is detected'. And/or, the UE may transmit A/N information to the base station based on/via/using 'an A/N codebook corresponding to the A/N information (i.e., the same as the A/N information) of PDSCH scheduled by DCI received based on other CORESET belonging to a CORESET group in which the beam failure is detected'.

The above-described proposal methods (e.g., the methods 1-1 and 1-2 of the proposal 1/the methods 2-1, 2-2 and 2-3 of the proposal 2/the methods 3-1, 3-2 and 3-3 of the proposal 3/the methods 4-1, 4-2 and 4-3 of the proposal 4/the methods 5-1, 5-2, 5-2a and 5-2b of the proposal 5, etc.) have been described based on the plurality of TRPs, but they can be equally applied to the transmission across multiple panels.

In terms of implementation, the base station/UE operations according to the above-described embodiments (e.g., operations related to the beam failure recovery based on at least one of the methods 1-1 and 1-2 of the proposal 1/the methods 2-1, 2-2 and 2-3 of the proposal 2/the methods 3-1, 3-2 and 3-3 of the proposal 3/the methods 4-1, 4-2 and 4-3 of the proposal 4/the methods 5-1, 5-2, 5-2a and 5-2b of the proposal 5, etc.) may be processed by a device of FIGS. 16 to 20 to be described later (e.g., processors 102 and 202 of FIG. 17).

In addition, the base station/UE operations according to the above-described embodiments (e.g., operations related to the beam failure recovery based on at least one of the methods 1-1 and 1-2 of the proposal 1/the methods 2-1, 2-2 and 2-3 of the proposal 2/the methods 3-1, 3-2 and 3-3 of the proposal 3/the methods 4-1, 4-2 and 4-3 of the proposal 4/the methods 5-1, 5-2, 5-2a and 5-2b of the proposal 5, etc.) may be stored in a memory (e.g., 104 and 204 of FIG. 17) in the form of a command/program (e.g., instruction, executable code) for running at least one processor (e.g., 102 and 202 of FIG. 17).

FIG. 13 illustrates an example of signaling between a UE and a base station to which a method described in the present disclosure is applicable. More specifically, FIG. 13 illustrates an example of signaling between a UE and a network side (e.g., TRP 1, TRP 2) in a situation of multiple TRPs (i.e., M-TRP, or multiple cells, all the following TRPs can be replaced by a cell) to which methods described in the present disclosure (e.g., the methods 1-1 and 1-2 of the proposal 1/the methods 2-1, 2-2 and 2-3 of the proposal 2/the methods 3-1, 3-2 and 3-3 of the proposal 3/the methods 4-1, 4-2 and 4-3 of the proposal 4/the methods 5-1, 5-2, 5-2a and 5-2b of the proposal 5, etc.) are applicable.

In the present disclosure, the UE and the network side are merely an example and may be replaced by various devices to be described below with reference to FIGS. 16 to 20. FIG. 13 is merely for convenience of description and does not limit a scope of the present disclosure. Further, some step(s) illustrated in FIG. 13 may be omitted depending on situation and/or setting, etc.

Referring to FIG. 13, signaling between the two TRPs and the UE is considered for convenience of description, but it is obvious that the signaling method can be extended and applied to signaling between multiple TRPs and multiple UEs. In the following description, the network side may be one base station including a plurality of TRPs, and may be one cell including a plurality of TRPs. For example, ideal/non-ideal backhaul may be configured between the TRP 1 and the TRP 2 constituting the network side. The following description is described based on the multiple TRPs, but it can be equally extended and applied to the transmission across multiple panels.

In addition, in the present disclosure, an operation of the UE receiving a signal from the TRP 1/TRP 2 may also be interpreted/described as an operation (may be an operation) of the UE receiving the signal from the network side (e.g., the base station) (via/using the TRP 1/TRP 2), and an operation of the UE transmitting a signal to the TRP 1/TRP 2 may also be interpreted/described as an operation (may be an operation) of the UE transmitting the signal to the network side (e.g., the base station) (via/using the TRP 1/TRP 2), and vice versa.

Referring to FIG. 13, it is assumed that a UE receives configuration/DCI from a representative TRP (e.g., TRP 1) in a situation of M-TRP (or cell, all the following TRPs may be replaced by cell/panel, or a case where a plurality of CORESETs are configured from one TRP may also be assumed as M-TRP). This is merely for convenience of description, and it is obvious that the following method can be extended and applied even if the UE receives the configuration/DCI from at least one TRP. For example, the representative TRP may be a TRP that transfers/transmits a signal related to SIB/paging/RA to the UE.

The UE may receive, from the network side, configuration information related to M-TRP based transmission/reception via/using the TRP 1 (and/or TRP 2), in S1310. The configuration information may include information related to configuration of the network side (i.e., TRP configuration)/information related to M-TRP based transmission/reception (e.g., resource allocation, . . . ), etc. In this instance, the configuration information may be transmitted via higher layer signaling (e.g., RRC signaling, MAC-CE, . . . ).

For example, the configuration information may include a BFD procedure and/or configuration information related to the BFD procedure described in the above-described proposal methods (e.g., the methods 1-1 and 1-2 of the proposal 1/the methods 2-1, 2-2 and 2-3 of the proposal 2/the methods 3-1, 3-2 and 3-3 of the proposal 3/the methods 4-1, 4-2 and 4-3 of the proposal 4/the methods 5-1, 5-2, 5-2a and 5-2b of the proposal 5, etc.). For example, the configuration information may include information (e.g., CORESET group related TCI state(s) configuration/CORESET group ID, . . . ) for CORESET/CORESET group(s) related to each TRP. For example, the configuration information may include information for BFD RS(s)/BFD RS set(s) related to the BFD procedure. For example, the configuration information may include configuration information for BFRQ resource related to the BFR procedure. For example, the configuration information may include CORESET configuration (see the CORESET described above).

For example, an operation of the UE (100/200 of FIGS. 16 to 20) in the step S1310 to receive the configuration information from the network side (100/200 of FIGS. 16 to 20) may be implemented by a device of FIGS. 16 to 20 to be described below. For example, referring to FIG. 17, one or more processors 102 may control one or more transceivers 106 and/or one or more memories 104 so as to receive the configuration information, and the one or more transceivers 106 may receive the configuration information from the network side.

The UE may receive, from the network side, BFD/BFR related information via/using the TRP 1 (and/or TRP 2) via MAC-CE and/or DCI, in S1320. For example, as in the above-described proposal methods (e.g., the methods 1-1 and 1-2 of the proposal 1/the methods 2-1, 2-2 and 2-3 of the proposal 2/the methods 3-1, 3-2 and 3-3 of the proposal 3/the methods 4-1, 4-2 and 4-3 of the proposal 4/the methods 5-1, 5-2, 5-2a and 5-2b of the proposal 5, etc.), the UE may receive information related to the BFD procedure and/or the BFR procedure via MAC-CE signaling and/or DCI. For example, as in the above-described method 1-2, the UE may receive, from the network side, information for update of BFD RS(s) via/using the TRP 1 (and/or TRP 2).

For example, an operation of the UE (100/200 of FIGS. 16 to 20) in the step S1320 to receive the BFD/BFR related information from the network side (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to receive the BFD/BFR related information, and the one or more transceivers 106 may receive the BFD/BFR related information from the network side.

The UE may perform the BFD procedure together with the network side (via/using the TRP 1 and/or the TRP 2), in S1330. For example, the UE may perform the BFD procedure based on the above-described proposal methods (e.g., the methods 1-1 and 1-2 of the proposal 1/the methods 2-1, 2-2 and 2-3 of the proposal 2/the methods 3-1, 3-2 and 3-3 of the proposal 3/the methods 4-1, 4-2 and 4-3 of the proposal 4/the methods 5-1, 5-2, 5-2a and 5-2b of the proposal 5, etc.).

For example, as in the above-described methods 1-1 and 1-2 of the proposal 1, the UE may perform the BFD procedure on only specific CORESET group(s) (i.e., specific TRP, etc.). In this case, the UE may determine a BFD RS to be used/applied to the BFD procedure based on the above-described methods 1-1 and 1-2 of the proposal 1. For example, as in the above-described methods 2-1, 2-2 and 2-3 of the proposal 2, the UE may construct/determine one or more BFD RS sets, and then perform the BFD for each BFD RS set. In this case, the one or more BFD RS sets may be configured on a per CORESET group basis, or configured based on configuration information by the network side.

For example, an operation of the UE (100/200 of FIGS. 16 to 20) in the step S1330 to perform the BFD procedure together with the network side (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to perform the BFD procedure, and the one or more transceivers 106 may perform transmission/reception related to the BFD procedure together with the network side.

The UE may perform the BFR procedure together with the network side (via/using the TRP 1 and/or the TRP 2), in S1340. For example, the UE may perform the BFR procedure based on the above-described proposal methods (e.g., the methods 1-1 and 1-2 of the proposal 1/the methods 2-1, 2-2 and 2-3 of the proposal 2/the methods 3-1, 3-2 and 3-3 of the proposal 3/the methods 4-1, 4-2 and 4-3 of the proposal 4/the methods 5-1, 5-2, 5-2a and 5-2b of the proposal 5, etc.).

For example, based on the above-described methods 3-1, 3-2 and 3-3 of the proposal 3, the UE may transmit the BFRQ to the network side according to a BR event generated for a specific BFD RS set (and/or CORESET group), and may implicitly/explicitly transmit, to the network side, information that the BFRQ is a BFRQ for which BFD RS set. For example, based on the proposal 4, the UE may transmit the BFRQ to the network side (via/using the TRP 1 and/or the TRP 2) considering the BFR case (e.g., BFR for SpCell, BFR for SCell, . . . ). For example, as in the above-described method 4-1, in the case of the BFR procedure for the SpCell, the UE may use a PRACH resource as an UL resource for BFRQ, and only if the UE finds a new beam RS in which RSRP exceeds a threshold, the UE may transmit the BFRQ to the network side via a PRACH resource connected to the new beam RS. In this case, a new beam candidate RS set may be separately configured every BFD RS set/CORESET group. For example, as in the above-described method 4-2, in the case of the BFR procedure for the SCell, even if the UE fails to find a new beam, the UE may transmit the BFRQ to the network side. For example, as in the above-described method 4-3, dedicated CORESET/search space (SS) receiving a response to the BFRQ may also be separately configured every BFD RS set/CORESET group. For example, as in the above-described proposal 5, the UE may receive a PDCCH response to the BFRQ transmitting to the network side, receive a PDSCH scheduled by the PDCCH, and transmit HARQ-ACK information for the PDSCH. For example, i) a BFR-CORESET for receiving the PDCCH response and/or ii) a HARQ-ACK codebook to be applied/used when transmitting the HARQ-ACK information may be determined/configured by the above-described methods 5-1/5-2/5-2a/5-2b.

For example, an operation of the UE (100/200 of FIGS. 16 to 20) in the step S1340 to perform the BFR procedure together with the network side (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to perform the BFR procedure, and the one or more transceivers 106 may perform transmission/reception related to the BFR procedure together with the network side.

As mentioned above, the above-described network side/UE signaling and operation (e.g., the methods 1-1 and 1-2 of the proposal 1/the methods 2-1, 2-2 and 2-3 of the proposal 2/the methods 3-1, 3-2 and 3-3 of the proposal 3/the methods 4-1, 4-2 and 4-3 of the proposal 4/the methods 5-1, 5-2, 5-2a and 5-2b of the proposal 5/FIG. 13, etc.) may be implemented by a device to be described below (e.g., FIGS. 16 to 20). For example, the network side (e.g., TRP 1/TRP 2) may correspond to a first wireless device, and the UE may correspond to a second wireless device. In some cases, the reverse may also be considered.

For example, the above-described network side/UE signaling and operation (e.g., the methods 1-1 and 1-2 of the proposal 1/the methods 2-1, 2-2 and 2-3 of the proposal 2/the methods 3-1, 3-2 and 3-3 of the proposal 3/the methods 4-1, 4-2 and 4-3 of the proposal 4/the methods 5-1, 5-2, 5-2a and 5-2b of the proposal 5/FIG. 13, etc.) may be processed by one or more processors (e.g., 102 and 202) of FIGS. 16 to 20. The above-described network side/UE signaling and operation (e.g., the methods 1-1 and 1-2 of the proposal 1/the methods 2-1, 2-2 and 2-3 of the proposal 2/the methods 3-1, 3-2 and 3-3 of the proposal 3/the methods 4-1, 4-2 and 4-3 of the proposal 4/the methods 5-1, 5-2, 5-2a and 5-2b of the proposal 5/FIG. 13, etc.) may be stored in a memory (e.g., one or more memories 104 and 204 of FIG. 17) in the form of a command/program (e.g., instruction, executable code) for running at least one processor (e.g., 102 and 202) of FIG. 17.

The embodiments described above are described from a UE operation perspective in detail below with reference to FIG. 14. Methods to be described below are distinguished merely for convenience of description. Therefore, it is obvious that partial configuration of any one method can be replaced by partial configuration of another method, or methods can be combined and applied.

FIG. 14 is a flow chart illustrating a method of performing, by a UE, a beam failure recovery procedure in a wireless communication system according to an embodiment of the present disclosure.

Referring to FIG. 14, a method of performing, by a UE, a beam failure recovery (BFR) procedure in a wireless communication system according to an embodiment of the present disclosure comprises a step S1410 of detecting a beam failure, a step S1420 of transmitting a beam failure recovery request (BFRQ), and a step S1430 of receiving a response to the beam failure recovery request (BFRQ).

In the step S1410, the UE performs a detection of the beam failure. The detection of the beam failure may be performed as described in 'Beam Failure Detection (BFD)'.

According to an embodiment, the detection of the beam failure may be related to at least one specific RS. The at least one specific RS may be related to a specific control resource set (CORESET) group of a plurality of CORESET groups. The present embodiment may be based on the proposal 1. The at least one specific RS may be related to QCL type D.

According to an embodiment, the at least one specific RS may include RSs based on transmission configuration indicator (TCI) states related to the specific CORESET group. The present embodiment may be based on the method 1-1.

According to an embodiment, the at least one specific RS may be based on RSs pre-configured for the detection of the beam failure. The present embodiment may be based on the method 1-2.

Based on that a TCI state related to any one CORESET of CORESETs within the specific CORESET group is updated, a specific RS of the pre-configured RSs may be updated.

The specific RS may be based on at least one of i) an RS related to the TCI state, ii) an RS having a quasi co-location (QCL) relationship with the RS related to the TCI state, or iii) an RS based on a specific order among the pre-configured RSs.

The update of the TCI state may be performed based on a specific message.

The specific message may include information for at least one of i) an RS related to the update, ii) the specific RS, or iii) whether the specific RS changes to the RS related to the update. The specific message may be based on an access control-control element (MAC-CE) for update of CORESET TCI state(s) update.

According to an embodiment, the plurality of CORESET groups may be related to a plurality of transmission and reception points (TRPs), and the specific CORESET group may be related to a specific TRP of the plurality of TRPs.

The specific TRP may be related to a transmission of specific control information. The specific control information may be related to at least one of a system information block (SIB), a paging, or a random access (RA).

According to the step S1410, an operation of the UE (100/200 of FIGS. 16 to 20) to perform the detection of the beam failure may be implemented by a device of FIGS. 16 to 20. For example, referring to FIG. 17, one or more processors 102 may control one or more transceivers 106 and/or one or more memories 104 so as to perform the detection of the beam failure.

In the step S1420, the UE transmits the beam failure recovery request (BFRQ) to a base station. The BFRQ may be transmitted based on a PRACH resource or a PUCCH resource.

According to the step S1420, an operation of the UE (100/200 of FIGS. 16 to 20) to transmit the beam failure recovery request (BFRQ) to the base station (100/200 of FIGS. 16 to 20) may be implemented by the device of FIGS. 16 to 20. For example, referring to FIG. 17, one or more processors 102 may control one or more transceivers 106 and/or one or more memories 104 so as to transmit the beam failure recovery request (BFRQ) to the base station 200.

In the step S1430, the UE receives a response to the BFRQ from the base station. An operation of the UE to receive the response to the BFRQ may be performed as described above in 'Monitoring of gNB's response to the BFRQ'.

According to the step S1430, an operation of the UE (100/200 of FIGS. 16 to 20) to receive the response to the BFRQ from the base station (100/200 of FIGS. 16 to 20) may be implemented by the device of FIGS. 16 to 20. For example, referring to FIG. 17, one or more processors 102 may control one or more transceivers 106 and/or one or more memories 104 so as to receive the response to the BFRQ from the base station 200.

The method may further comprise a step of receiving a PDSCH related to the response to the BFRQ and a step of transmitting HARQ-ACK information.

In the step of receiving the PDSCH, the UE receives, from the base station, a physical downlink shared channel (PDSCH) scheduled by downlink control information (DCI) related to the response to the BFRQ.

According to the step, an operation of the UE (100/200 of FIGS. 16 to 20) to receive the PDSCH scheduled by the DCI related to the response to the BFRQ from the base station (100/200 of FIGS. 16 to 20) may be implemented by the device of FIGS. 16 to 20. For example, referring to FIG. 17, one or more processors 102 may control one or more transceivers 106 and/or one or more memories 104 so as to receive the PDSCH scheduled by the DCI related to the response to the BFRQ from the base station 200.

In the step of transmitting the HARQ-ACK information, the UE transmits the HARQ-ACK information related to the PDSCH to the base station.

According to an embodiment, the HARQ-ACK information may be transmitted based on a specific codebook. The specific codebook may be related to any one CORESET within the specific CORESET group. The present embodiment may be based on the method 5-1.

According to the step, an operation of the UE (100/200 of FIGS. 16 to 20) to transmit the HARQ-ACK information related to the PDSCH to the base station (100/200 of FIGS. 16 to 20) may be implemented by the device of FIGS. 16 to 20. For example, referring to FIG. 17, one or more processors 102 may control one or more transceivers 106 and/or one or more memories 104 so as to transmit the HARQ-ACK information related to the PDSCH to the base station 200.

The embodiments described above are described from a BS operation perspective in detail below with reference to FIG. 15. Methods to be described below are distinguished merely for convenience of description. Therefore, it is obvious that partial configuration of any one method can be replaced by partial configuration of another method, or methods can be combined and applied.

FIG. 15 is a flow chart illustrating a method of performing, by a base station, a beam failure recovery procedure in a wireless communication system according to another embodiment of the present disclosure.

Referring to FIG. 15, a method of performing, by a base station, a beam failure recovery (BFR) procedure in a wireless communication system according to another embodiment of the present disclosure comprises a step S1510 of receiving a beam failure recovery request (BFRQ) and a step S1520 of transmitting a response to the beam failure recovery request (BFRQ).

In the step S1510, the base station receives the beam failure recovery request (BFRQ) from a UE. The BFRQ may be transmitted based on a PRACH resource or a PUCCH resource.

The BFRQ may be transmitted based on a detection of a beam failure of the UE. The detection of the beam failure may be performed as described in 'Beam Failure Detection (BFD)'.

According to an embodiment, the detection of the beam failure may be related to at least one specific RS. The at least one specific RS may be related to a specific control resource set (CORESET) group of a plurality of CORESET groups. The present embodiment may be based on the proposal 1. The at least one specific RS may be related to QCL type D.

According to an embodiment, the at least one specific RS may include RSs based on transmission configuration indicator (TCI) states related to the specific CORESET group. The present embodiment may be based on the method 1-1.

According to an embodiment, the at least one specific RS may be based on RSs pre-configured for the detection of the beam failure. The present embodiment may be based on the method 1-2.

Based on that a TCI state related to any one CORESET of CORESETs within the specific CORESET group is updated, a specific RS of the pre-configured RSs may be updated.

The specific RS may be based on at least one of i) an RS related to the TCI state, ii) an RS having a quasi co-location (QCL) relationship with the RS related to the TCI state, or iii) an RS based on a specific order among the pre-configured RSs.

The update of the TCI state may be performed based on a specific message.

The specific message may include information for at least one of i) an RS related to the update, ii) the specific RS, or iii) whether the specific RS changes to the RS related to the update. The specific message may be based on an access control-control element (MAC-CE) for update of CORESET TCI state(s).

According to an embodiment, the plurality of CORESET groups may be related to a plurality of transmission and reception points (TRPs), and the specific CORESET group may be related to a specific TRP of the plurality of TRPs.

The specific TRP may be related to a transmission of specific control information. The specific control information may be related to at least one of a system information block (SIB), a paging, or a random access (RA).

According to the step S1510, an operation of the base station (100/200 of FIGS. 16 to 20) to receive the beam failure recovery request (BFRQ) from the UE (100/200 of FIGS. 16 to 20) may be implemented by a device of FIGS. 16 to 20. For example, referring to FIG. 17, one or more processors 202 may control one or more transceivers 206 and/or one or more memories 204 so as to receive the beam failure recovery request (BFRQ) from the UE 100.

In the step S1520, the base station transmits the response to the BFRQ to the UE. An operation of the base station to transmit the response to the BFRQ may be performed as described above in 'Monitoring of gNB's response to the BFRQ'.

According to the step S1520, an operation of the base station (100/200 of FIGS. 16 to 20) to transmit the response to the BFRQ to the UE (100/200 of FIGS. 16 to 20) may be implemented by the device of FIGS. 16 to 20. For example, referring to FIG. 17, one or more processors 202 may control one or more transceivers 206 and/or one or more memories 204 so as to transmit the response to the BFRQ to the UE 100.

The method may further comprise a step of transmitting a PDSCH related to the response to the BFRQ and a step of receiving HARQ-ACK information.

In the step of transmitting the PDSCH, the base station transmits, to the UE, a physical downlink shared channel (PDSCH) scheduled by downlink control information (DCI) related to the response to the BFRQ.

According to the step, an operation of the base station (100/200 of FIGS. 16 to 20) to transmit the PDSCH scheduled by the DCI related to the response to the BFRQ to the UE (100/200 of FIGS. 16 to 20) may be implemented by the device of FIGS. 16 to 20. For example, referring to FIG. 17, one or more processors 202 may control one or more transceivers 206 and/or one or more memories 204 so as to transmit the PDSCH scheduled by the DCI related to the response to the BFRQ to the UE 100.

In the step of receiving the HARQ-ACK information, the base station receives the HARQ-ACK information related to the PDSCH from the UE.

According to an embodiment, the HARQ-ACK information may be transmitted based on a specific codebook. The specific codebook may be related to any one CORESET within the specific CORESET group. The present embodiment may be based on the method 5-1.

According to the step, an operation of the base station (100/200 of FIGS. 16 to 20) to receive the HARQ-ACK information related to the PDSCH from the UE (100/200 of FIGS. 16 to 20) may be implemented by the device of FIGS. 16 to 20. For example, referring to FIG. 17, one or more processors 202 may control one or more transceivers 206 and/or one or more memories 204 so as to receive the HARQ-ACK information related to the PDSCH from the UE 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 16 illustrates a communication system 1 applied to the present disclosure.

Referring to FIG. 16, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s)

102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 18 illustrates a signal process circuit for a transmission signal.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 19 illustrates another example of a wireless device applied to the present disclosure.

The wireless device may be implemented in various forms according to a use-case/service (refer to FIG. 16). Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 20 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of a method of performing a beam failure recovery procedure according to an embodiment of the present disclosure and a device therefor are as follows.

According to an embodiment of the present disclosure, beam failure detection (BFD) is performed on RSs related to a specific CORESET group. Thus, when a UE receiving multi-DCI from a plurality of TRPs detects a beam failure, a BFD target is limited to RSs related to a specific TRP transmitting important control information, and at the same time reliability for the transmission of the important control information can be secured.

Here, wireless communication technology implemented in wireless devices 100 and 200 of FIG. 17 of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100 and 200 of FIG. 17 of the present disclosure may perform communication based on LTE-M technology. In this case, as an example, the LTE-M technology may be an example of the LPWAN and may be called various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. Additionally or alternatively, the wireless communication technology implemented in the wireless devices 100 and 200 of FIG. 17 of the present disclosure may includes at least one of ZigBee, Bluetooth, and Low Power Wide Area Network (LPWAN) considering the low-power communication, and is not limited to the name described above. As an example, the ZigBee technology may generate personal area networks (PAN) associated with small/low-power digital communication based on various standards including IEEE 802.15.4, and the like, and may be called various names The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method of performing, by a user equipment (UE), a beam failure recovery (BFR) in a wireless communication system, the method comprising:
receiving configuration information which is related to the BFR, wherein the configuration information includes information for i) a Beam Failure Detection Reference Signal (BFD RS) set and ii) a RS set for candidate beam identification;
performing beam failure detection, wherein the beam failure detection is performed based on a measurement for the BFD RS set;
transmitting a beam failure recovery request (BFRQ) based on a Physical Uplink Control Channel (PUCCH) resource; and
transmitting a Medium Access Control-Control Element (MAC-CE) related to the BFR which includes information for a RS determined based on the RS set for the candidate beam identification,
wherein, i) based on the BFD RS set being based on a plurality of BFD RS sets, ii) based on each of the plurality of BFD RS sets being related to each of a plurality of Transmission and Reception Points (TRPs) and iii) based on the RS set for the candidate beam identification being based on a plurality of RS sets for the candidate beam identification:
each of the plurality of RS sets for the candidate beam identification is related to each of the plurality of BFD RS sets, respectively,
the BFRQ is transmitted based on one of a plurality of PUCCH resources which are configured to be associated with the plurality of BFD RS sets,
the MAC-CE related to the BFR includes i) information for at least one BFD RS set and ii) information for at least one RS,
the information for at least one RS includes an ID of a RS determined based on one of the plurality of RS sets for the candidate beam identification, and
the information for at least one BFD RS set includes an ID for a BFD RS set in which the beam failure is detected among the plurality of BFD RS sets.

2. The method of claim 1, wherein, based on at least one of the plurality of BFD RS sets not being configured based on the configuration information:
the at least one of the plurality of BFD RS sets is determined as a BFD RS set including RSs which are based on one or more transmission configuration indicator states (TCI states) related to a plurality of control resource set (CORESET) groups.

3. The method of claim 1,
wherein the beam failure detection is performed based on a counting of a beam failure instance (BFI) which is determined based on the measurement for the BFD RS set,
wherein, based on a BFI value being equal to or greater than a maximum beam failure instance count which is pre-configured, it is determined that the beam failure is detected, and
wherein the BFI value is determined based on the counting of the BFI being performed before a BFD timer which is pre-configured expires.

4. The method of claim 3, wherein, based on the plurality of BFD RS sets, the BFD timer and the maximum beam failure instance count are configured for each of the plurality of BFD RS sets, and the BFI value is determined for each of the plurality of BFD RS sets.

5. The method of claim 1, further comprising:
receiving control information which is related to an allocation of UL resources for the transmission of the MAC-CE, wherein the UL resources are related to a Physical Uplink Shared Channel (PUSCH).

6. A user equipment (UE) performing a beam failure recovery (BFR) in a wireless communication system, the UE comprising:
one or more transceivers;
one or more processors configured to control the one or more transceivers; and
one or more memories operatively connected to the one or more processors and configured to store instructions performing operations based on being executed by the one or more processors,
wherein the operations comprise:
receiving configuration information which is related to the BFR, wherein the configuration information includes information for i) a Beam Failure Detection Reference Signal (BFD RS) set and ii) a RS set for candidate beam identification;

performing a beam failure detection, wherein the beam failure detection is performed based on a measurement for the BFD RS set;

transmitting a beam failure recovery request (BFRQ) based on a Physical Uplink Control Channel (PUCCH) resource; and transmitting a Medium Access Control-Control Element (MAC-CE) related to the BFR which includes information for a RS determined based on the RS set for the candidate beam identification, wherein, i) based on the BFD RS set being based on a plurality of BFD RS sets, ii) based on each of the plurality of BFD RS sets being related to each of a plurality of Transmission and Reception Points (TRPs) and iii) based on the RS set for the candidate beam identification being based on a plurality of RS sets for the candidate beam identification:

each of the plurality of RS sets for the candidate beam identification is related to each of the plurality of BFD RS sets, respectively, the BFRQ is transmitted based on one of a plurality of PUCCH resources which are configured to be associated with the plurality of BFD RS sets, the MAC-CE related to the BFR includes i) information for at least one BFD RS set and ii) information for at least one RS, the information for at least one RS includes an ID of a RS determined based on one of the plurality of RS sets for the candidate beam identification, and the information for at least one BFD RS set includes an ID for a BFD RS set in which the beam failure is detected among the plurality of BFD RS sets.

7. The UE of claim 6, wherein, based on at least one of the plurality of BFD RS sets not being configured based on the configuration information:

the at least one of the plurality of BFD RS sets is determined as a BFD RS set including RSs based on one or more transmission configuration indicator states (TCI states) related to a plurality of control resource set (CORESET) groups.

8. A method of performing, by a base station, a beam failure recovery (BFR) in a wireless communication system, the method comprising:

transmitting configuration information which is related to the BFR, wherein the configuration information includes information for i) a Beam Failure Detection Reference Signal (BFD RS) set and ii) a RS set for candidate beam identification;

based on a beam failure detection, receiving a beam failure recovery request (BFRQ) based on a Physical Uplink Control Channel (PUCCH) resource, wherein the beam failure detection is performed, by a user equipment (UE), based on a measurement for the BFD RS set, receiving a Medium Access Control-Control Element (MAC-CE) related to the BFR which includes information for a RS determined based on the RS set for the candidate beam identification, wherein, i) based on the BFD RS set being based on a plurality of BFD RS sets, ii) based on each of the plurality of BFD RS sets being related to each of a plurality of Transmission and Reception Points (TRPs) and iii) based on the RS set for the candidate beam identification being based on a plurality of RS sets for the candidate beam identification:

each of the plurality of RS sets for the candidate beam identification is related to each of the plurality of BFD RS sets, respectively, the BFRQ is received based on one of a plurality of PUCCH resources which are configured to be associated with the plurality of BFD RS sets, the MAC-CE related to the BFR includes i) information for at least one BFD RS set and ii) information for at least one RS, the information for at least one RS includes an ID of a RS determined based on one of the plurality of RS sets for the candidate beam identification, and the information for at least one BFD RS set includes an ID for a BFD RS set in which the beam failure is detected among the plurality of BFD RS sets.

9. The method of claim 8, wherein the beam failure detection is performed based a counting of a beam failure instance (BFI) which is determined based on the measurement for the BFD RS set, wherein, based on a BFI value being equal to or greater than a maximum beam failure instance count which is pre-configured, it is determined that the beam failure is detected, and wherein the BFI value is determined based on the counting of the BFI being performed before a BFD timer which is pre-configured expires.

10. The method of claim 9, wherein, based on the plurality of BFD RS sets, the BFD timer and the maximum beam failure instance count are configured for each of the plurality of BFD RS sets, and the BFI value is determined for each of the plurality of BFD RS sets.

11. The method of claim 8, further comprising:

transmitting control information which is related to an allocation of UL resources for the transmission of the MAC-CE, wherein the UL resources are related to a Physical Uplink Shared Channel (PUSCH).

* * * * *